(12) United States Patent
Hutchison et al.

(10) Patent No.: US 7,606,760 B2
(45) Date of Patent: Oct. 20, 2009

(54) METHOD AND APPARATUS FOR ORDERING GOODS, SERVICES AND CONTENT OVER AN INTERNETWORK USING A VIRTUAL PAYMENT ACCOUNT

(75) Inventors: Robin B. Hutchison, Vancouver (CA); George A. Fleming, White Rock (CA); Alan Chedalawada, Seattle, WA (US); Robert Llewellyn, Poulsbo, WA (US); David Griffiths, Ware (GB); David Birch, Woking (GB)

(73) Assignee: eCharge Corporation, seattle, WA (US)

( * ) Notice: Subject to any disclaimer, the term of this patent is extended or adjusted under 35 U.S.C. 154(b) by 1002 days.

(21) Appl. No.: 10/671,320

(22) Filed: Sep. 24, 2003

(65) Prior Publication Data

US 2005/0192896 A1 Sep. 1, 2005

Related U.S. Application Data

(63) Continuation of application No. 10/337,214, filed on Jan. 6, 2003, now abandoned, which is a continuation of application No. 09/370,949, filed on Aug. 9, 1999, now abandoned.

(60) Provisional application No. 60/140,039, filed on Jun. 18, 1999.

(51) Int. Cl.
*G06Q 40/00* (2006.01)
(52) U.S. Cl. .............................. 705/39; 705/75; 902/22
(58) Field of Classification Search .................. 705/26, 705/36, 39–44, 64–68, 71–79; 902/1–11, 902/22, 24; 707/9–10; 709/223–226
See application file for complete search history.

(56) References Cited

U.S. PATENT DOCUMENTS 5,557,518 A * 9/1996 Rosen .......................... 705/69

(Continued)

FOREIGN PATENT DOCUMENTS

EP 0 765 068 A2 3/1997

(Continued)

OTHER PUBLICATIONS

Internet Business News, published Jan. 1, 1998.*

(Continued)

*Primary Examiner*—Mary Cheung
(74) *Attorney, Agent, or Firm*—Christensen O'Connor Johnson Kindness PLLC

(57) ABSTRACT

A virtual payment card system for ordering and paying for goods, services and content over an internetwork is disclosed. The virtual payment card system comprises a commerce gateway component (52) and a credit processing server component (53). The virtual payment card system is a secure closed system comprising registered merchants and consumers. A consumer becomes a registered participant by applying for a virtual payment card. Likewise, a merchant becomes registered by applying for a merchant account. A consumer can instantly open an account on-line. That is, the credit processing component (53) immediately evaluates the consumer's virtual payment card application and assigns a credit limit to the account. Once an account is established, a digital certificate is stored on the registered participant's computer. The consumer can then order a product, i.e., goods, services or content from a merchant and charge it to the virtual payment card. When the product is shipped, the merchant notifies the commerce gateway component (52), which in turn notifies the credit processing server which applies the charges to the consumer's virtual card account. The consumer can settle the charges using a prepaid account, a credit card, or by using reward points earned through use of the virtual payment card. A consumer may create sub-account that have additional limitations imposed on the owner of the sub-account.

19 Claims, 36 Drawing Sheets

U.S. PATENT DOCUMENTS

| | | | |
|---|---|---|---|
| 5,610,980 A * | 3/1997 | Johnson et al. | 713/189 |
| 5,715,314 A | 2/1998 | Payne et al. | |
| 5,724,424 A * | 3/1998 | Gifford | 705/79 |
| 5,737,414 A | 4/1998 | Walker et al. | |
| 5,768,382 A | 6/1998 | Schneier et al. | |
| 5,779,549 A | 7/1998 | Walker et al. | |
| 5,794,207 A | 8/1998 | Walker et al. | |
| 5,797,127 A | 8/1998 | Walker et al. | |
| 5,798,508 A | 8/1998 | Walker et al. | |
| 5,870,473 A | 2/1999 | Boesch et al. | |
| 5,899,980 A | 5/1999 | Wilf et al. | |
| 6,119,105 A | 9/2000 | Williams | |
| 6,332,134 B1 * | 12/2001 | Foster | 705/36 R |
| 2001/0039535 A1 * | 11/2001 | Tsiounis et al. | 705/71 |

FOREIGN PATENT DOCUMENTS

| | | |
|---|---|---|
| EP | 0 818 907 A2 | 1/1998 |
| EP | 0 883 076 A2 | 12/1998 |
| EP | 0 902 381 A2 | 3/1999 |
| WO | WO 96/37848 | 11/1996 |
| WO | WO 97/01920 | 1/1997 |
| WO | WO 97/29584 | 8/1997 |
| WO | 98/09260 A1 | 3/1998 |

OTHER PUBLICATIONS

Paul Lang's article Product Review eCharge Billing system published Apr. 1998, retrieved from http://sellitontheweb.com/ezine/echarge.shtml by examiner on Dec. 10, 2008.* http://www.echarge.att.com/how_wk..html, "AT&T eCharge: How Does It Work?" available at least as early as Oct. 29, 1997.

http://www.echarge.att.com/cgi-bin/Register.cgi, "AT&T eCharge: Apply for an Account," available at least as early at Oct. 29, 1997.

http://www.echarge.att.com/cgi-bin/Activate.cgi, "AT&T eCharge: Activate Your Account," available at least as early at Oct. 29, 1997.

http://www.echarge.att.com/cgi-bin/Transactions.cgi, "AT&T eCharge: Account Activity," available at least as early as Oct. 29, 1997.

http://www.echarge.att.com/indesx.html, "AT&T eCharge: Welcome to AT&T eCharge," available at least as early as Oct. 29, 1997.

http://www.echarge.att.com/faq.html, "AT&T eCharge: Frequently Asked Questions/Customer Support," available at least as early as Oct. 29, 1997.

http://www.echarge.att.com/, "AT&T eCharge: Simple," available at least as early as Oct. 29, 1997.

http://www.echarge.att.com/terms_conditions.html, "AT&T eCharge: Frequently Asked Questions/Customer Support," available at least as early as Oct. 29, 1997.

"Victims Seeking Cheap Online Erotica Aroused by Not-So-Cheap Phone Bills;" San Jose Mercury News; Published: Feb. 20, 1997; Section: Business; p. 1C.

* cited by examiner

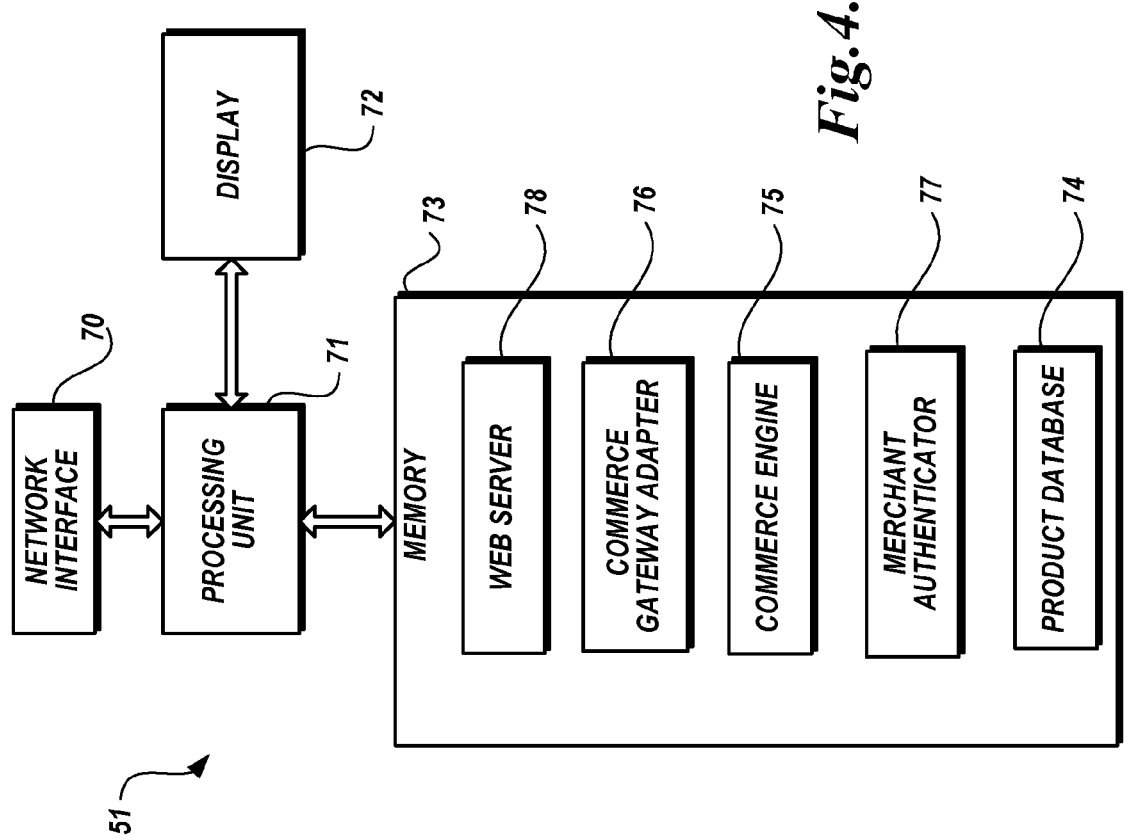
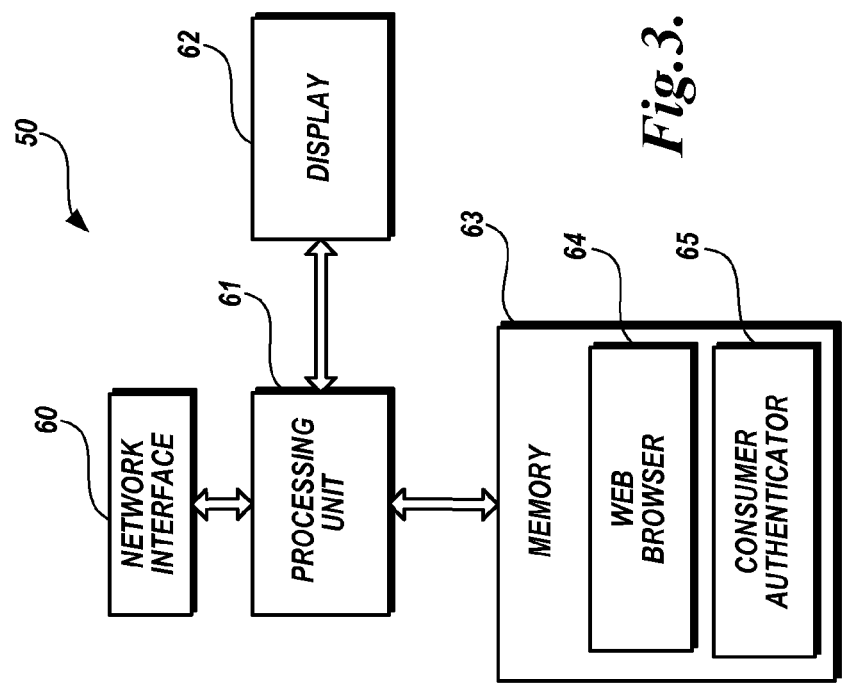

Quick App

WELCOME TO QUICK APP, OUR INSTANT ONLINE APPROVAL SYSTEM FOR A VIRTUAL PAYMENT ACCOUNT. COMPLETE THE SHORT APPLICATION FORM. YOUR APPLICATION WILL BE PROCESSED IMMEDIATELY. WE'LL LET YOU KNOW ONLINE IF YOU ARE APPROVED.

ENTER USER ID AND EMAIL (PAGE 1 OF 3)

| NAME | CHRIS SMITH |
| EMAIL | CHRISSSMITH@LIFELINE.NET |

Quick App

*PLEASE PROVIDE INFORMATION THAT WILL CONFIDENTIALLY BE USED TO DETERMINE YOUR CREDIT LIMIT. IN ADDITION, YOU WILL AUTOMATICALLY RECEIVE A PREPAY ACCOUNT FOR YOUR CONVENIENCE.*

TELL US ABOUT YOURSELF (PAGE 2 OF 3)

| | |
|---:|:---|
| SOCIAL SECURITY # | 123-45-6789 |
| DATE OF BIRTH | 01 / 01 / 1950  MM/DD/YYYY |
| MOTHER'S MAIDEN LAST NAME | SMITH |
| EMPLOYER | ACME CORP. |
| ANNUAL HOUSE INCOME | 75,000  PER YEAR |
| EMPLOYMENT STATUS | FULL TIME ▼ |

Quick App

TELL US ABOUT YOURSELF   (PAGE 3 OF 3)

| | | | |
|---:|:---|---:|:---|
| FIRST | CHRIS | M.I. | |
| LAST | SMITH | SUFFIX | |
| STREET | 123 OAK STREET | (NO P.O. BOX) | |
| UNIT/APT # | | | |
| CITY | VANCOUVER | | |
| STATE | WA ▼ | ZIP | 12045 |
| HOME PHONE | ( ) | | 555-1212 |
| ACCOUNT PASSWORD | | | |
| CONFIRM PASSWORD | | | |

Quick App

CONGRATULATIONS! YOUR VIRTUAL CREDIT ACCOUNT HAS BEEN APPROVED WITH A CREDIT LIMIT OF $5,000.

YOUR VIRTUAL PAYMENT WILL SIMPLIFY YOUR ONLINE PURCHASES. EXPRESS CHECKOUT WILL AUTOMATICALLY PROVIDE THE MERCHANT WITH YOUR SHIPPING INFORMATION, ALLOWING YOU TO PAY FOR YOUR PURCHASES QUICKLY. AND OUR DIGITAL CERTIFICATE TECHNOLOGY WILL ENSURE THE SECURITY OF YOUR VIRTUAL PAYMENT ACCOUNT.

FOR YOU CONVENIENCE, A PREPAY VIRTUAL ACCOUNT HAS BEEN CREATED FOR YOU. YOU CAN USE YOUR PREPAY ACCOUNT FOR ONLINE PURCHASES OF ANY SIZE. THE CHARGES FROM SMALL TRANSACTIONS WILL ACCUMULATE IN YOUR PREPAY ACCOUNT INTEREST-FREE UNTIL THE BALANCE REACHES $5.00. THE BALANCE IS THEN TRANSFERRED TO YOUR CREDIT ACCOUNT.

PLEASE CUSTOMIZE YOUR VIRTUAL PAYMENT ACCOUNT BY ADDING SPECIAL FEATURES.

Account Setup

YOUR VIRTUAL CREDIT ACCOUNT CAN BE CUSTOMIZED TO MEET YOUR NEEDS. CUSTOMIZING YOUR ACCOUNT WILL GIVE YOU GREATER CONTROL OVER YOUR INTERNET PURCHASES AND YOUR VIRTUAL PAYMENT ACCOUNT MANAGEMENT. YOU CAN ALWAYS CHANGE THESE PREFERENCES LATER BY USING THE "MODIFY ACCOUNT" SECTION OF THE VIRTUAL PAYMENT ACCOUNT SITE.

PREFERENCES

YOU HAVE BOTH A CREDIT AND A PREPAY ACCOUNT. HOW WOULD YOU LIKE TO MAKE YOUR PURCHASES:

- ○ USE CREDIT ONLY
- ○ USE PREPAY ONLY
- ○ GIVE ME AN OPTION TO USE MY CREDIT OR PREPAY AT EACH TRANSACTION

HOW WOULD YOU LIKE TO USE YOUR IPAY REWARD POINTS?

- ○ ACCUMULATE POINTS IN ACCOUNT FOR MERCHANT DISCOUNTS, MILES, OR FREE CELLULAR MINUTES
- ○ PROVIDE DISCOUNTS ON SHIPPING AT EACH ELIGIBLE TRANSACTION

<u>FUNDING YOUR PREPAY ACCOUNT</u>

Account Setup

CHOOSE ADDITIONAL ACCOUNT FEATURES

*YOUR BASIC ACCOUNT IS FREE (INCLUDES REWARD POINTS). YOU MAY ALSO CHOOSE TO ADD THE FOLLOWING FEATURES:*

- *SUPPLEMENTARY ACCOUNTS: ALLOW FAMILY MEMBERS OR BUSINESS PARTNERS TO SHARE YOUR IPAY ACCOUNT*
- *YOUNG SHOPPER ACCOUNTS: SET UP SPENDING LIMITS AND SAFE SHOPPING SITES FOR YOUR KIDS*
- *BUYER ACCOUNTS: SET UP SPENDING LIMITS AND AUTHORIZED SHOPPING SITES FOR YOUR STAFF*
- *LOW INTEREST OPTION: REDUCE THE ANNUAL INTEREST RATE OF 12.0% TO 5.9%*

PRICING

<u>CREATE-YOUR-OWN</u> – *COMBINE ANY OF THE FOLLOWING FEATURE TO CREATE A VIRTUAL PAYMENT ACCOUNT THAT MEETS YOUR NEEDS:*

- *SUPPLEMENTARY ACCOUNTS: $10.00/YEAR*
- *YOUNG SHOPPER ACCOUNTS: $15.00/YEAR*
- *BUYER ACCOUNTS: $15.00/YEAR*
- *LOW INTEREST OPTION: $20/YEAR*

<u>FAMILY PACKAGE - $20 / YEAR</u>

- *UNLIMITED SUPPLEMENTARY ACCOUNTS*
- *UNLIMITED YOUNG SHOPPER ACCOUNTS*

<u>BUSINESS PACKAGE - $39 / YEAR</u>

- *UNLIMITED SUPPLEMENTARY ACCOUNTS*
- *UNLIMITED BUYER ACCOUNTS*
- *LOW INTEREST OPTION*

Account Setup

ADD SUPPLEMENTARY USER

PLEASE COMPLETE THIS FORM TO ADD A SUPPLEMENTARY USER. TO ADD MORE THAN ONE USER TO YOUR ACCOUNT, CLICK THE ADD ANOTHER BUTTON. TO ADD ONLY THIS USER, CLICK THE ADD USER BUTTON.

[EXIT]

- USER NAME
- EMAIL ADDRESS
- PASSWORD
- CONFIRM PASSWORD

[ADD ANOTHER]  [ADD USER ▶]

Account Setup

ADD YOUNG SHOPPER

PLEASE COMPLETE THIS FORM TO ADD A SHOPPER. TO ADD MORE THAN ONE SHOPPER TO YOUR ACCOUNT, CLICK THE ADD ANOTHER BUTTON. TO ADD ONLY THIS SHOPPER, CLICK THE ADD USER BUTTON.

[ EXIT ]

- USER NAME: [ ]
- EMAIL ADDRESS: [ ]
- PASSWORD: [ ]
- CONFIRM PASSWORD: [ ]
- SPENDING LIMIT: [ $ ]
- RESET LIMIT: ○ EVERY MONTH  ○ EVERY QUARTER  ○ EVERY YEAR  ○ MANUAL RESET
- PARENTAL CONTROLS: ☐ NET NANNY  ☐ EMAIL AUTHORIZATION  ☐ SPECIFIC SITES  ☐ NONE
- APPROVED WEBSITES: [ ]

[ ADD ANOTHER ]  [ ADD USER ▶ ]

Account Information

CHRIS SMITH
123 OAK STREET, VANCOUVER, WA, USA 12045
CHRISSMITH@LIFELINE.NET

ACCOUNT INFORMATION
RECENT TRANSACTIONS
STATEMENTS
MAKE A PAYMENT
REWARDS PROGRAM
MODIFY ACCOUNT
INQUIRIES
LOG-OUT

FOR DETAILED INFORMATION SELECT AN ACCOUNT:

| USER NAME | SPENDING LIMIT | AVAILABLE CREDIT |
|---|---|---|
| CHRIS | $4,500* | $3327.51 |
| TERRY | $4,500* | $3327.51 |
| KIMMIE | $500* | $346.89 |

* DENOTES SHARED LIMIT.

LINK TO INTEREST AND STATEMENT INFORMATION.
LINK TO ACCOUNT HOLDER'S POLICY.

Account Information

CHRIS SMITH
123 OAK STREET, VANCOUVER, WA, USA 12045
CHRISSMITH@LIFELINE.NET

ACCOUNT INFORMATION
RECENT TRANSACTIONS
STATEMENTS
MAKE A PAYMENT
REWARDS PROGRAM
MODIFY ACCOUNT
INQUIRIES
LOG-OUT

ACCOUNT DETAILS FOR CHRIS:

| | |
|---|---|
| USER TYPE | PRIMARY ACCOUNT HOLDER |
| CURRENT ACCOUNT BALANCE | $1,285.55 |
| AVAILABLE CREDIT | $3,327.51 (SHARED) |
| ALLOCATED CREDIT | $346.89 |
| CREDIT LIMIT | $5,000.00 |
| STATEMENT SCHEDULE | MONTHLY |
| NEXT STATEMENT | 31 MARCH 1999 |
| CURRENT INTEREST RATE | 12.0% |
| ACCOUNT FEATURES | FAMILY PACKAGE |

◄ BACK

RECENT TRANSACTIONS

CHRIS SMITH
123 OAK STREET, VANCOUVER, WA, USA 12045
CHRISSMITH@LIFELINE.NET

ACCOUNT INFORMATION
RECENT TRANSACTIONS
STATEMENTS
MAKE A PAYMENT
REWARDS PROGRAM
MODIFY ACCOUNT
INQUIRIES
LOG-OUT

RECENT TRANSACTIONS FOR YOUR VIRTUAL PAYMENT ACCOUNT ARE OUTLINED BELOW. THESE ARE UNBILLED TRANSACTIONS ONLY – THEY HAVE NOT YET APPEARED ON A STATEMENT.

TRANSACTIONS SINCE MARCH 1, 1999:

| DATE | REFERENCE | PARTICULARS | AMOUNT |
|---|---|---|---|
| TRANSACTIONS FOR CHRIS | | | $ |
| 3/9/99 | 921102 | GOLF DIGEST WWW.GOLFDIGEST.COM | 40.00 |
| 3/10/00 | 931225 | SOAP SOLUTIONS WWW.SOAPSOLEI.COM | 35.00 |
| 3/12/99 | 954455 | WOMAN'S PANTS WWW.PANTALONS.COM | 55.00 |
| 322/99 | A33418 | PAYMENT FROM BANK ONE - THANK YOU | -140.00 |
| TRANSACTIONS FOR TERRY | | | |
| 3/22/99 | 921102 | JCREW WWW.JCREW.COM | 350.00 |
| TRANSACTIONS FOR KIMMIE | | | |
| NONE | | | |

REWARDS PROGRAM

CHRIS SMITH
123 OAK STREET, VANCOUVER, WA, USA 12045
CHRISSMITH@LIFELINE.NET

ACCOUNT INFORMATION
RECENT TRANSACTIONS
STATEMENTS
MAKE A PAYMENT
REWARDS PROGRAM
MODIFY ACCOUNT
INQUIRIES
LOG-OUT

YOU CAN ACCESS PAST STATEMENT INFORMATION FOR YOUR REWARDS PROGRAM. FOR YOUR RECORDS, YOU MAY WISH TO PRINT THIS INFORMATION. TO DO SO, PLEASE CLICK ON THE "PRINT STATEMENT" BUTTON.

PLEASE SELECT A STATEMENT TO VIEW:

[ FEBRUARY 28, 1999 ▼ ]   [ VIEW STATEMENT ]

LAST STATEMENT    THIS STATEMENT     [ PRINT STATEMENT ]
  01/30/1999         02/28/1999

PREVIOUS BALANCE   TOTAL EARNED   TOTAL REDEEMED   NEW BALANCE
       186 +            37 -            0 =            223

DATE         DESCRIPTION                              POINTS
M/D/Y

STATEMENT ITEMS FOR CHRIS:
02/02/1999  CBS SPORTSLINE  CBS.SPORTSLINE.COM          2
02/06/1999  AMAZON.COM  WWW.AMAZON.COM                 20
02/16/1999  GOLFERS' HEAVAN  WWW.GOLFERSHEAVAN.COM      2
02/16/1999  NEW YORK TIMES  WWW.NYTIMES.COM             1

STATEMENT ITEMS FOR TERRY:
02/20/1999  AVEDA  WWW.AVEDA.COM                        6
02/23/1999  VICTORIA SECRET  WWW.VICTORIASECRET.COM     3

STATEMENT ITEMS FOR KIMMIE:
02/25/1999  GAP  WWW.GAP.COM                            3

PLEASE REPORT ANY ITEMS SHOWN WHICH DO NOT AGREE WITH YOUR RECORDS WITHIN 30 DAYS.

METHOD AND APPARATUS FOR ORDERING GOODS, SERVICES AND CONTENT OVER AN INTERNETWORK USING A VIRTUAL PAYMENT ACCOUNT

CROSS-REFERENCE TO RELATED APPLICATIONS

This application is a continuation of U.S. patent application Ser. No. 10/337,214, filed on Jan. 6, 2003, now abandoned which in turn is a continuation of U.S. patent application Ser. No. 09/370,949, filed on Aug. 9, 1999, now abandoned priority from the filing dates of which is hereby claimed under 35 U.S.C. § 120. U.S. patent application Ser. No. 09/370,949 claims under 35 U.S.C. § 119 the benefit of provisional Application No. 60/140,039, filed Jun. 18, 1999.

FIELD OF THE INVENTION

This invention generally relates to a method and apparatus for ordering goods, services and content from one or more other computers connected via common communications links and, more particularly, to a method and apparatus for ordering goods, services and content from computers connected to the Internet using a virtual payment account.

BACKGROUND OF THE INVENTION

Communication networks are well known in the computer communications field. By definition, a network is a group of computers and associated devices that are connected by communications facilities or links. Network communications can be of a permanent nature, such as via cables, or can be of a temporary nature, such as connections made through telephone or radio links. Networks may vary in size, from a local area network (LAN) consisting of a few computers or workstations and related devices; to a wide area network (WAN) which interconnects computers and LANs that are geographically dispersed; to a remote access service (RAS) which interconnects remote computers via temporary communication links. An internetwork, in turn, is the joining of multiple computer networks, both similar and dissimilar, by means of gateways or routers that facilitate data transfer and conversion from various networks. A well-known abbreviation for the term internetwork is "Internet." As currently understood, the capitalized term "Internet" refers to the collection of networks and routers that use the Transmission Control Protocol/Internet Protocol (TCP/IP) to communicate with one another.

A representative section of the Internet 40 is shown in FIG. 1 (Prior Art) in which a plurality of local area networks (LANs) 44 and a wide area network (WAN) 46 are interconnected by routers 42. The routers 42 are generally special purpose computers used to interface one LAN or WAN to another. Communication links within the LANs may be twisted wire pair, or coaxial cable, while communication links between networks may utilize 56 Kbps analog telephone lines, or 1 Mbps digital T-1 lines and/or 45 Mbps T-3 lines. Further, computers and other related electronic devices can be remotely connected to either the LANs 44 or the WAN 46 via a modem and temporary telephone link. Such computers and electronic devices 48 are shown in FIG. 1 as connected to one of the LANs 44 by a dotted line. It will be appreciated that the Internet comprises a vast number of such interconnected networks, computers, and routers and that only a small, representative section of the Internet 40 is shown in FIG. 1.

The Internet has recently seen explosive growth by virtue of its ability to link computers located throughout the world. As the Internet has grown, so has the World Wide Web (WWW). The WWW is a vast collection of interconnected or "hypertext" documents (also known as "Web pages") written in HyperText Markup Language (HTML) that are electronically stored at "Web sites" throughout the Internet. A Web site is a server connected to the Internet that has mass storage facilities for storing hypertext documents and that runs administrative software for handling requests for those stored hypertext documents. A hypertext document normally includes a number of hyperlinks, i.e., highlighted portions of text that link the document to another hypertext document possibly stored at a Web site elsewhere on the Internet. Each hyperlink is associated with a Uniform Resource Locator (URL) that provides the exact location of the linked document on a server connected to the Internet. Thus, whenever a hypertext document is retrieved from any Web server, the document is considered to be retrieved from the WWW.

A user is allowed to retrieve hypertext documents from the WWW, i.e., a user is allowed to "surf the Web," via a Web browser. A Web browser, such as Netscape's NAVIGATOR® or Microsoft's INTERNET EXPLORER®, is a software program implemented by a Web client, i.e., the user's computer, to provide a graphical user interface to the WWW. Upon request from the user via the Web browser, the Web client accesses and retrieves the desired hypertext document or Web page from the appropriate Web server using the URL for the document and a protocol known as HyperText Transfer Protocol (HTTP). HTTP is a higher-level protocol than TCP/IP and is designed specifically for the requirements of the WWW. It is used on top of TCP/IP to transfer hypertext documents between servers and clients.

At the advent of the WWW, the information stored on the Internet was freely transferred back and forth between those parties interested in the information. However, the WWW is quickly becoming a channel of commercial activity, whereby a vast number of companies have developed their own Web sites for advertising and selling their goods and services. Commercial activity that takes place by means of connected computers is known as electronic commerce, or e-commerce, and can occur between a user and a vendor through an on-line information service, the Internet, a bulletin board system (BBS), or between vendor and customer computers through electronic data interchange (EDI). A user (also referred to as a consumer or purchaser in the context of e-commerce) may "visit the Web site" of a company, i.e., retrieve the hypertext documents located on the Web server of a particular company, and order any good or service that the company has to offer. If that good or service is in the form of electronically stored information, such as a book, a video, a computer game, etc., the consumer may simply download the good or service from the company's Web site to his or her computer for immediate consumption and use. If the good or service is of a more tangible nature, such as an appliance or article of clothing ordered from an on-line catalog, a more conventional method of delivery, e.g., the postal service or a common carrier, is used.

A common method of payment for e-commerce purchases is an electronic credit, or e-credit. E-credit is a form of electronic commerce involving credit card transactions carried out over the Internet. Traditional e-credit purchases are paid for by a major credit card, wherein the consumer is required to transmit his or her credit information, for example, an account number and private identification number (PIN), over the Internet to the company's Web site. Many consumers are concerned about the security and confidentiality of such electronic transmissions. Furthermore, many consumers do not have a major credit card with which to make such purchases. Alternative billing systems, such as providing credit information by facsimile or postal service, are much less convenient and often prove enough of a barrier to prohibit the sale altogether. Finally, the traditional methods of billing and payment do not adequately protect the seller or consumer from fraudulent purchases.

Accordingly, a more effective method and apparatus for ordering and billing for goods, services and content over a network, and ultimately the Internet, is needed. The method and apparatus should protect the seller and consumer from fraudulent purchases. Additionally, the method and apparatus should provide an element of non-repudiation to all transactions. The method and apparatus should also prevent consumers with histories of nonpayment from purchasing additional goods, services and/or content. Finally, the method and apparatus should allow a consumer without a major credit card to purchase goods, services and content over the network.

SUMMARY OF THE INVENTION

The present invention provides a computer program for ordering products from computers connected to the Internet, wherein the consumer is automatically billed for the ordered good, service or content based on a virtual payment account maintained by a commerce gateway.

In accordance with other aspects of the present invention, the commerce gateway interfaces with a credit processing server to handle the monetary aspects involved in purchasing goods, services and/or content. The credit processing server interfaces with one or more financial institutions which physically handle the consumer's account. For example, a consumer can pay for purchases electronically by transferring funds from a bank account held by the consumer at the financial institution, or by prepaying for the purchases by sending a check to the provider of the commerce gateway. Alternatively, reward points earned by using the virtual payment account can be applied towards purchases.

In accordance with still other aspects of the present invention, the credit processing server communicates with one or more credit bureaus in order to determine a credit limit for a consumer's virtual payment account.

In accordance with yet other aspects of the present invention, a virtual payment account can have associated sub-accounts. A sub-account can have a credit limit that is less than the main account credit limit. A sub-account can limit the merchant sites from which goods, services and/or content can be purchased.

In accordance with further aspects of the present invention, purchases must be made by a registered consumer from a registered merchant. Security is ensured via authentication of the parties to a transaction. Authentication can be performed by verification of a private key, a digital certificate, or a combination thereof, known as a digital signature.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a block diagram of the several components of the consumer's computer shown in FIG. 2 that is used to order goods, services and/or content from the Internet in accordance with the present invention;

FIG. 4 is a block diagram of the several components of a merchant server shown in FIG. 2 that provides the ordered goods, services and/or content in accordance with the present invention;

FIGS. 8A-8E are exemplary pages displayed on a consumer computer when applying for a virtual payment account in accordance with the present invention;

FIGS. 9A-9D are exemplary Web pages used by a consumer to customize the virtual payment account applied for in accordance with the present invention;

Figures 5, 6:
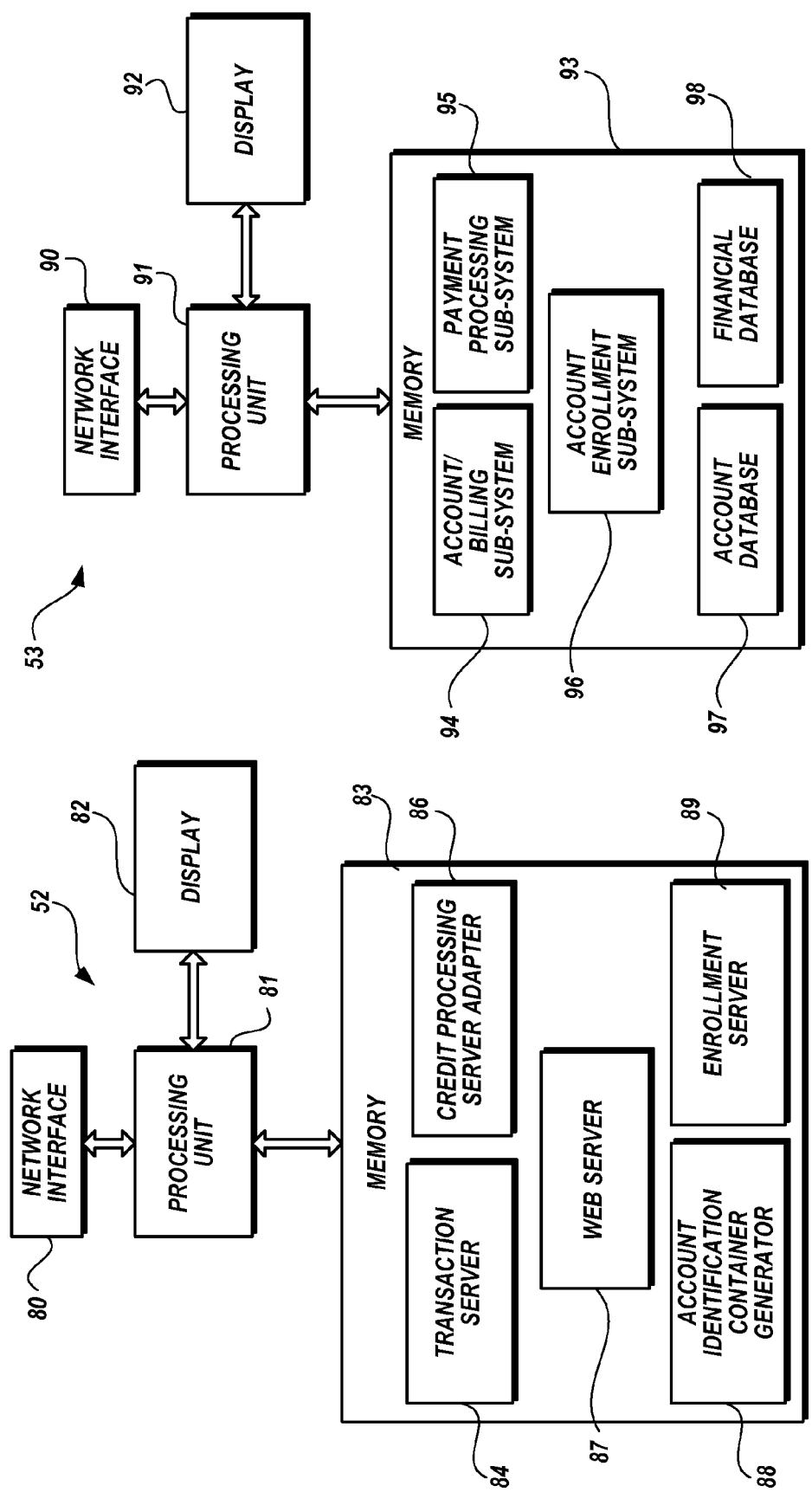
FIG. 5 is a block diagram of the several components of a commerce gateway shown in FIG. 2 that is used to interface between the Internet and a card processing server in accordance with the present invention.
FIG. 6 is a block diagram of the several components of a credit processing server shown in FIG. 2 that provides for the payment of the ordered goods, services and/or content in accordance with the present invention.
Figure 21:
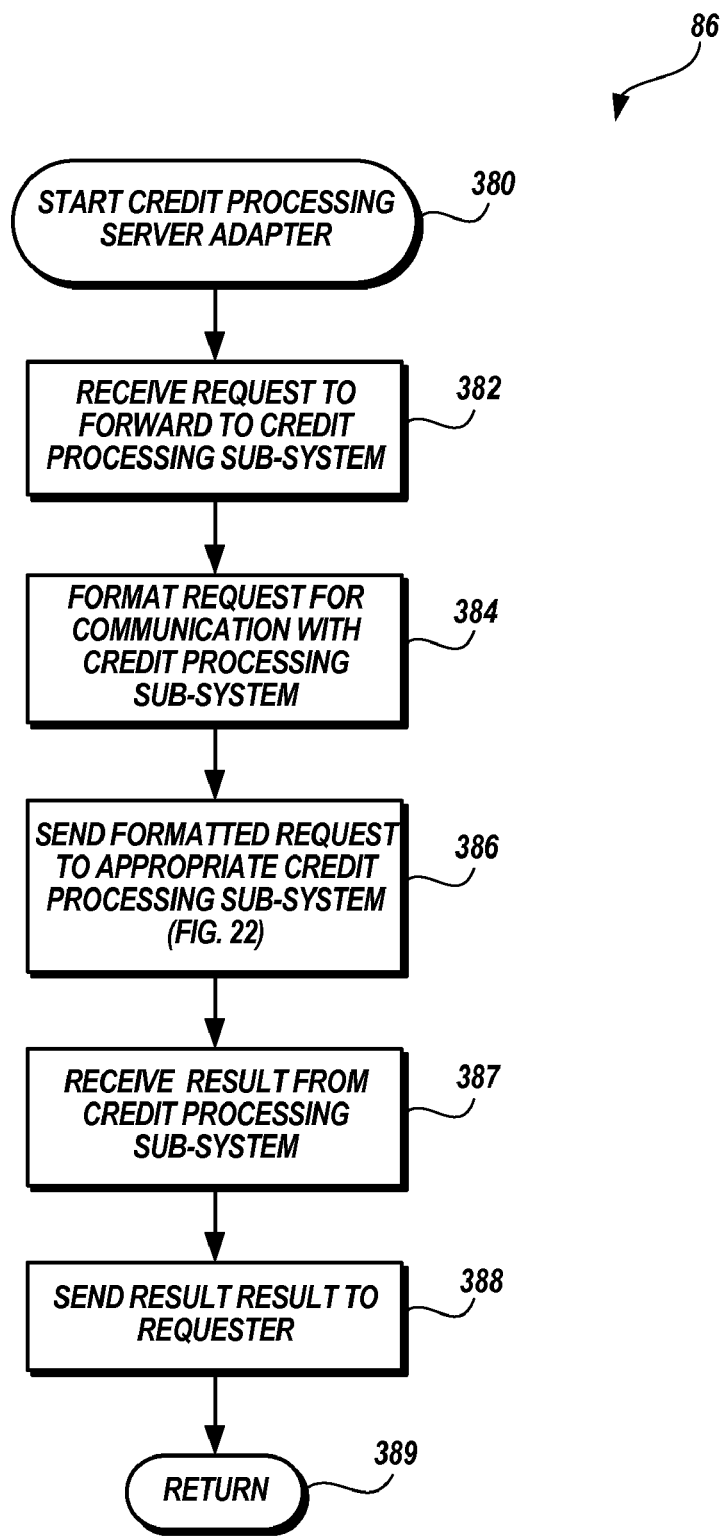
Figure 22:
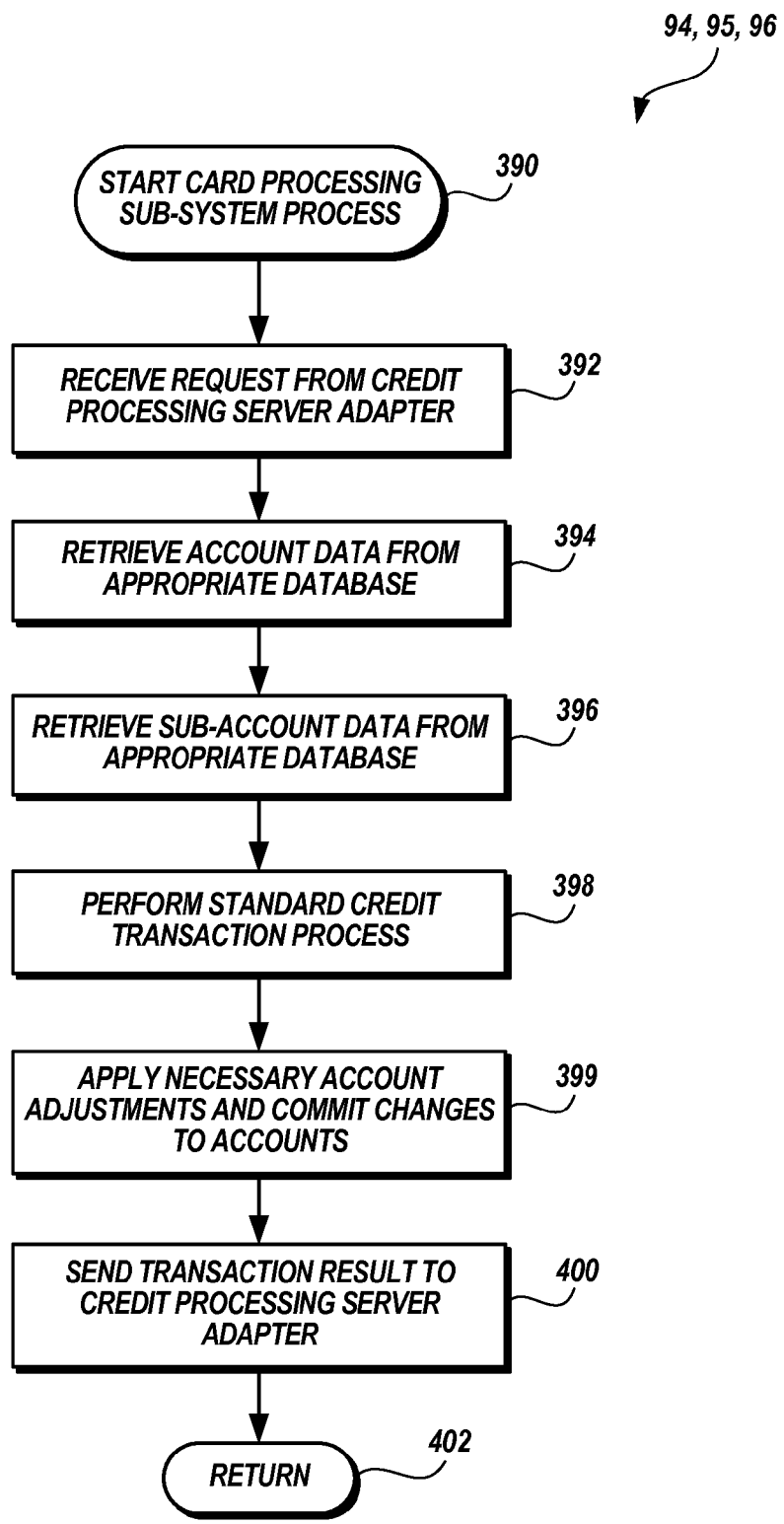
Figure 23:
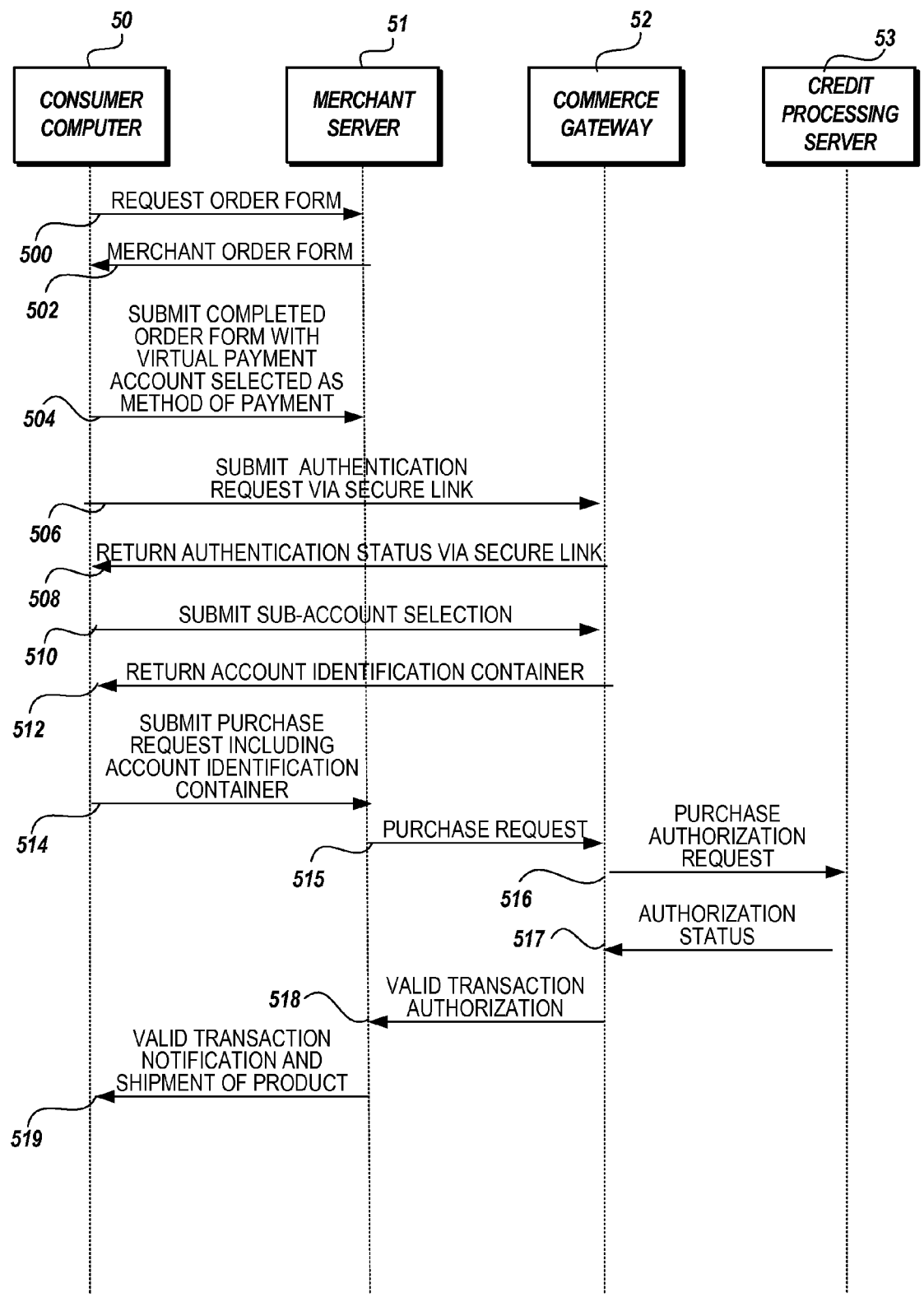
Figure 24:
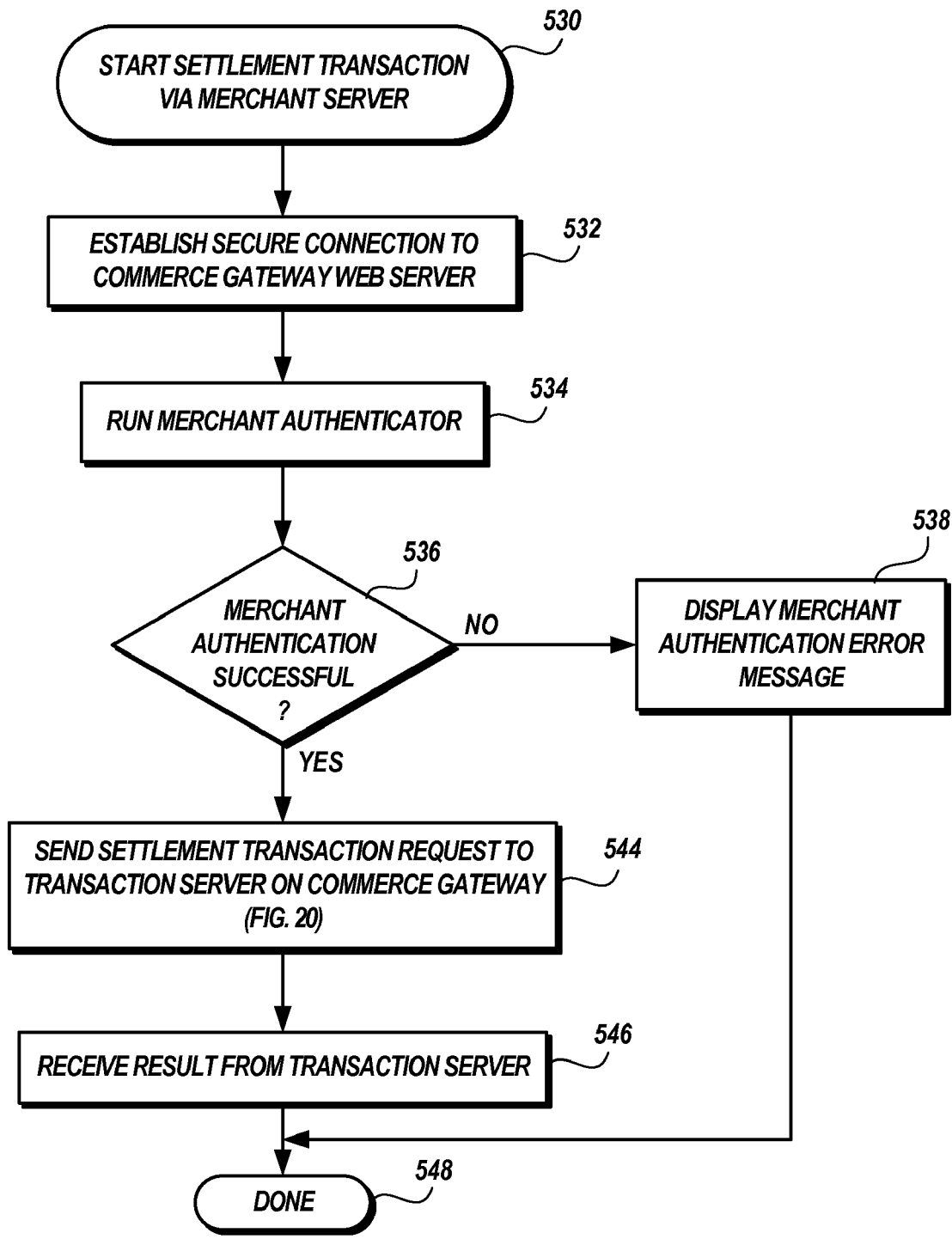
Figure 25:
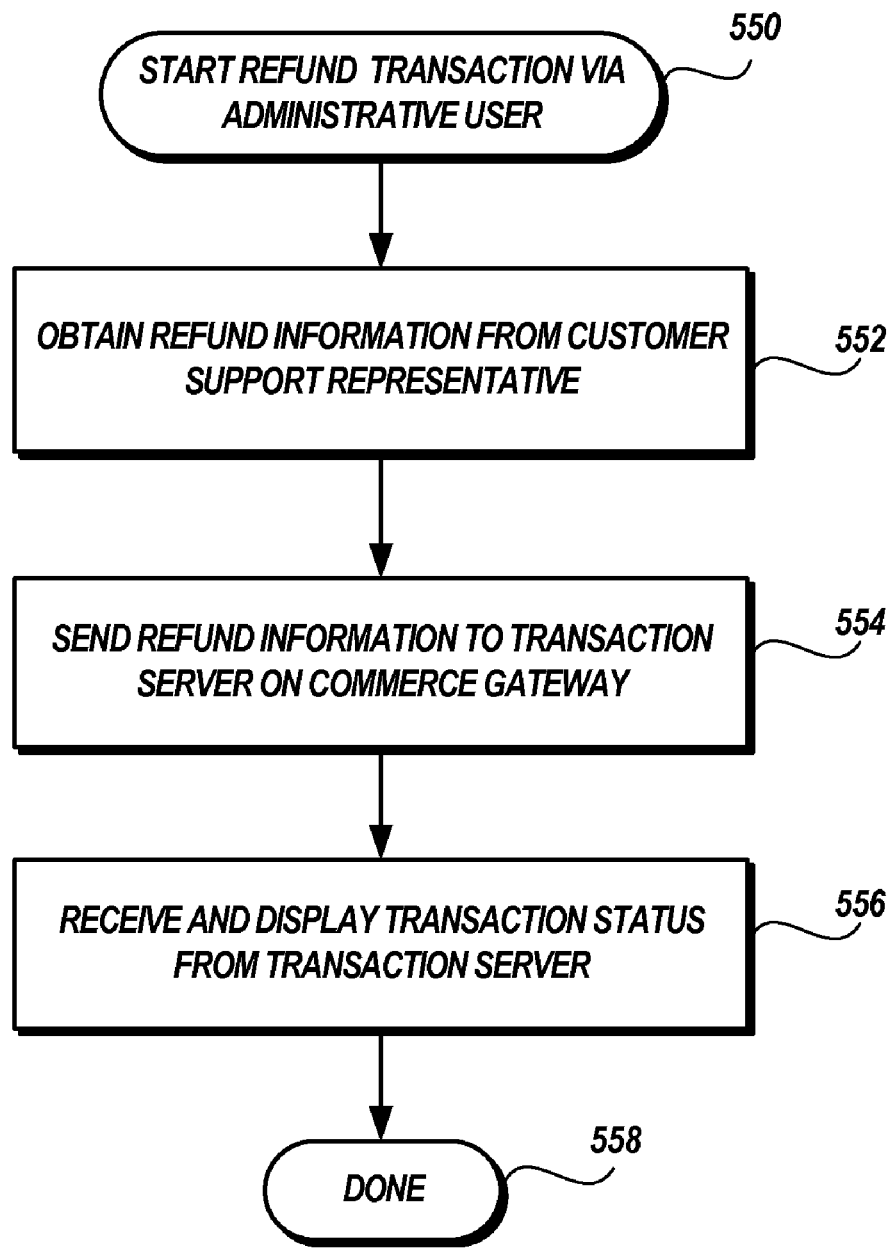

FIGS. 21 and 22 are flow diagrams illustrating the logic used by various sub-systems of the credit processing server shown FIG. 6 to provide for payment of goods, services and/or content ordered over the Internet using a virtual payment account;

FIG. 23 is a diagram illustrating the actions taken by the consumer's computer, the merchant server, the commerce gateway, and the credit processing server to order goods, services and/or content using the virtual payment account;

FIG. 24 is a flow diagram illustrating the logic used by the merchant's computer to perform a settlement transaction, i.e., initiate transfer of funds;

FIG. 25 is a flow diagram illustrating the logic used by the administrator's computer to initiate a refund to be applied to a virtual payment account in accordance with the present invention; and FIGS. 26-29 are exemplary Web pages used by a consumer to perform account maintenance functions in accordance with the present invention.

DETAILED DESCRIPTION OF THE PREFERRED EMBODIMENT

Figure 1:
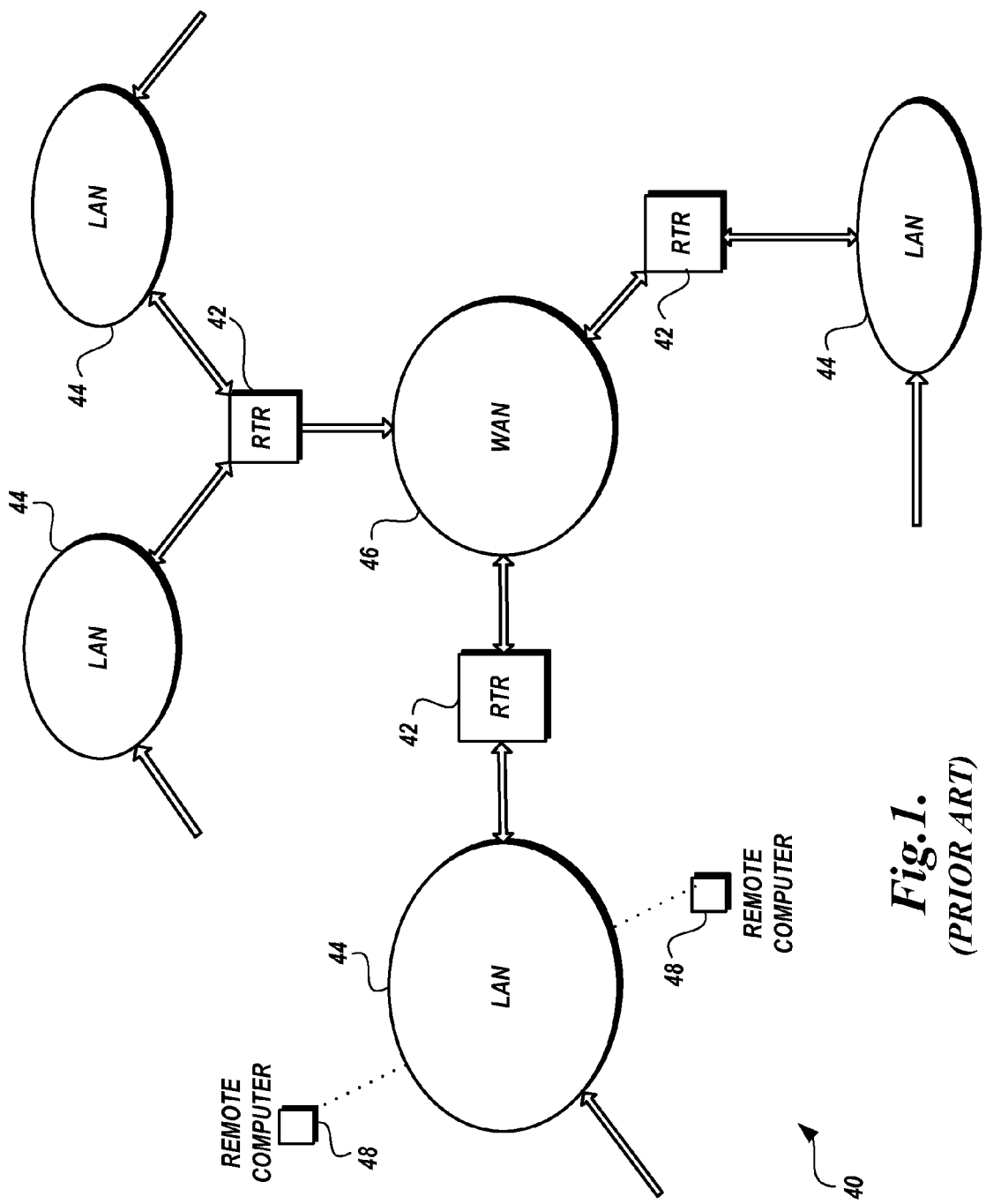
FIG. 1 (Prior Art) is a block diagram of a representative portion of the Internet.

As previously described and shown in FIG. 1, the Internet 40 is a collection of local area networks and (LANs) 44, wide area networks (WANs) 46, remote computers 48 and routers 42 that use the Transmission Control Protocol/Internet Protocol (TCP/IP) to communicate with each other. The World Wide Web (WWW), on the other hand, is vast collection of interconnected, electronically stored information located on servers connected throughout the Internet 40. Many companies are now selling goods, services and access to their premium content over the Internet using the WWW. In accordance with the present invention, a consumer orders goods, services and/or content (referred to interchangeably herein as "products") over the Internet 40 via a Web browser and is automatically billed for the purchase using his or her virtual payment account without transferring sensitive account information, such as account number and expiration date, over the Internet 40. The virtual payment account allows a consumer to settle transactions of the virtual payment account using a prepaid or credit account. In one actual embodiment of the present invention, the virtual payment account uses bank electronic funds transfers, for example, using the Automated Clearing House (ACH) standard which is maintained by the National Automated Clearing House Association (NACHA)—the standards group promoting electronic commerce standards. In another embodiment, the virtual payment account can be funded using a traditional paper check, with the consumer mailing a check, e.g., via the postal service, to the providers of the virtual payment account system. Alternatively, funds transfer services and electronic bill payment services, such as CHECKFREE®, may be used. Reward points, also known as loyalty points, earned through use of the virtual payment card can also be applied to the consumer's virtual payment account to pay for products.

Figure 2:
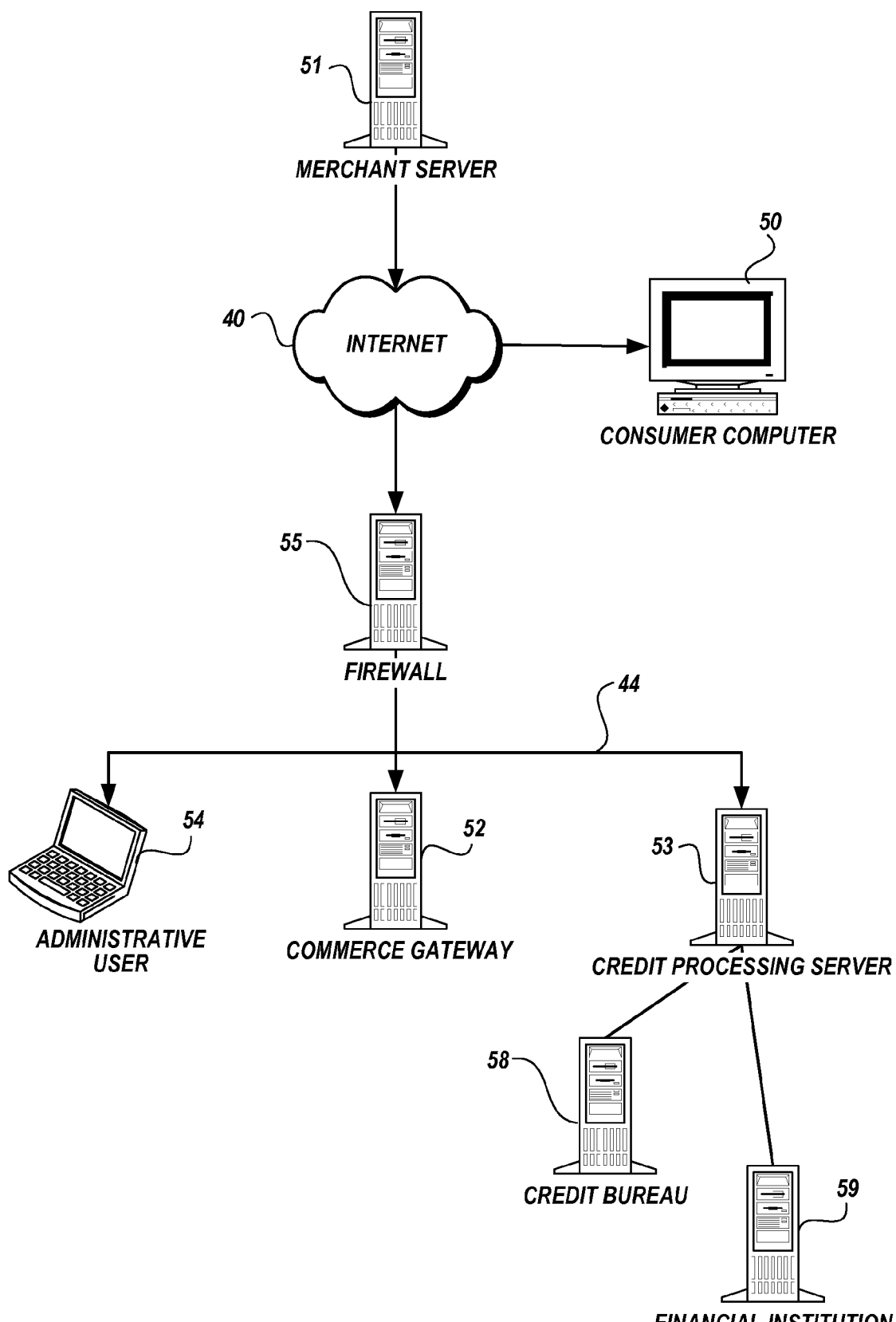
FIG. 2 is a pictorial diagram of a local area network (LAN) connected to the Internet which supplies goods, services and/or content ordered by a consumer using a computer located elsewhere on the Internet in accordance with the present invention.

More specifically, as shown in FIG. 2, the consumer purchases goods, services, and/or premium content from a merchant server 51, i.e., a server owned by the merchant which sponsors or sells the product, by placing an order with the merchant server from a computer 50 connected to the Internet 40. The order is processed and confirmed by a commerce gateway 52 connected to a LAN 44 located elsewhere in the Internet 40. The commerce gateway 52 is also connected to a credit processing server 53 via the LAN 44. The credit processing server communicates with one or more credit bureaus 58 in order to determine the credit worthiness of a consumer. In the actual embodiment of the present invention described herein, the credit bureau 58 is a server provided and administrated by a credit agency for processing credit reports. The credit bureau 58 can be located on the LAN 44 or elsewhere on the Internet 40. In yet another embodiment, the credit processing server can establish a point-to-point connection with a remote credit bureau that is not either connected to the LAN 44 or the Internet 40. It will be appreciated that other methods of communication between the credit processing server 53 and credit bureau 58 may be used, for example, a secure Virtual Private Network maintained and operated by the credit bureau exclusively for the purpose of credit rating. Finally, in yet other embodiments, the credit bureau may not actually offer a server at all. Rather, a customer service representative for the credit bureau may process the credit report and manually provide the report to an administrator of the present invention who manually enters the report to the credit processing server 53. The credit processing server 53 also communicates with one or more financial institutions 59 for the purpose of obtaining the consumer's payment, i.e., a transfer of funds for the purchase of products. As is the case with the credit bureaus 58, the financial institutions 59 may be other servers in electronic communication with the credit processing server 53, customer service representatives in more traditional communication with the credit processing server 53, or some combination thereof.

Finally, in addition to the commerce gateway 52, the LAN 44 includes an administrative computer 54 used to administer vendor, and purchaser information and services provided by the commerce gateway 52 and credit processing server 53.

In the embodiment of the present invention shown in FIG. 2, the LAN 44 is insulated from the Internet 40 by a firewall server 55 that tracks and controls the flow of all data passing through it using the TCP/IP protocol. The firewall 55 protects the LAN 44 from malicious in-bound data traffic. The LAN 44 is a bus network interconnecting the various computers and servers. The LAN 44 shown in FIG. 2 can be formed of various coupling media such as glass or plastic fiberoptic cables, coaxial cables, twisted wire pair cables, ribbon cables, etc. In addition, one of ordinary skill in the art will appreciate that the coupling medium can also include a radio frequency coupling media or other intangible coupling media. Any computer system or number of computer systems, including but not limited to workstations, personal computers, laptop computers, servers, remote computers, etc., that is equipped with the necessary interface hardware may be connected temporarily or permanently to the LAN 44, and thus, the Internet 40. However, if temporarily connected via a telephone link to another device connected to the LAN 44, the interface hardware of both the remote computer 48 and the device to which it is connected must contain a modem.

Finally, those of ordinary skill in the art will recognize that while only one consumer computer 50, and one merchant server 51 are depicted in FIG. 2, numerous consumer computers and merchant servers equipped with the hardware and software components described below may be connected to the Internet 40. It will also be appreciated that the term "consumer" used herein can be applied to any purchaser of goods and/or services and can be applied equally to an individual, non-commercial purchaser or a business or commercial purchaser. In other words, the term "consumer" can apply to any purchaser and the term "merchant" can apply to any vendor.

Relevant Consumer Computer Merchant Server, Commerce Gateway, and Credit Processing Server Components FIG. 3 depicts several of the key components of the consumer's computer 50. Those of ordinary skill in the art will appreciate that the consumer's computer 50 includes many more components then those shown in FIG. 3. However, it is not necessary that all of these generally conventional components be shown in order to disclose an illustrative embodiment for practicing the present invention. As shown in FIG. 3, the consumer's computer includes a network interface 60 for connecting to a LAN 44 or WAN 46, or for connecting remotely to a LAN or WAN. Those of ordinary skill in the art will appreciate that the network interface 60 includes the necessary circuitry for such a connection, and is also constructed for use with the TCP/IP protocol, the particular network configuration of the LAN or WAN it is connecting to, and a particular type of coupling medium.

The consumer's computer 50 also includes a processing unit 61, a display 62, and a memory 63. The memory 63 generally comprises a random access memory (RAM), a read-only memory (ROM) and a permanent mass storage device, such as a disk drive. The memory 63 stores the program code and data necessary for ordering and paying for a product over the Internet 40 in accordance with the present invention. More specifically, the memory 63 stores a Web browser component 64, such as Netscape's NAVIGATOR® or Microsoft's INTERNET EXPLORER® browsers, and a consumer authenticator component 65 formed in accordance with the present invention for authenticating a consumer as a registered participant of the virtual payment system prior to performing any virtual payment account transactions. It will be appreciated that these components may be stored on a computer-readable medium and loaded into memory 63 of the consumer computer 50 using a drive mechanism associated with the computer-readable medium, such as a floppy or CD-ROM drive.

As will be described in more detail below, the products ordered by the consumer are supplied by a merchant server 51, described next, following authorization from a remote server, i.e., a commerce gateway 52 described later, located elsewhere on the Internet, e.g., on LAN 44 illustrated in FIG. 2. FIG. 4 depicts several of the key components of the merchant server 51. Those of ordinary skill in the art will appreciate that the merchant server 51 includes many more components than those shown in FIG. 4. However, it is not necessary that all of these generally conventional components be shown in order to disclose an illustrative embodiment of practicing the present invention. As shown in FIG. 4, the merchant server 51 includes a network interface 70 for connecting to a LAN 44 or WAN 46, or for connecting remotely to a LAN or WAN. Those of ordinary skill in the art will appreciate that the network interface 70 includes the necessary circuitry for such a connection, and is also constructed for use with the TCP/IP protocol, the particular network configuration of the LAN or WAN it is connecting to, and a particular type of coupling medium.

The merchant server 51 also includes a processing unit 71, a display 72, and a memory 73. The memory 73 generally comprises a random access memory (RAM), read-only memory (ROM), and a permanent mass storage device, such as a hard disk drive, tape drive, optical drive, floppy disk drive, or combination thereof. In one actual embodiment of the present invention, the memory contains a product database 74 which includes the electronically stored good or service ordered by the consumer. In other embodiments of the present invention, the product database 74 stores the premium content ordered by the consumer, i.e., the hypertext documents or other electronically stored information considered of monetary value by the merchant. In yet other embodiments of the present invention, the goods may be tangible goods not capable of being electronically stored, in which case the product database includes descriptive information of the products. The memory 73 also contains a commerce engine component 75 for purchasing a product from a merchant Web site. The commerce engine component 75 may be an existing commerce engine, such as MICROSOFT® Site Server, which allows for the payment of products ordered over the Internet using a major credit card, e.g., VISA® or MASTERCARD®. A commerce gateway adapter component 76 is also provided to allow the commerce engine component 75 to interface with the commerce gateway 52. The commerce gateway adapter component uses and provides application programming interface (API) calls to interface with the commerce engine 75. Also included in memory is a merchant authenticator component 77 for verifying that the merchant is an authorized or registered merchant of the virtual payment system of the present invention. It will be appreciated that the product database 74, the commerce engine component 75, the commerce gateway adapter component 76 and the merchant authenticator component 77 may be stored on a computer-readable medium and loaded into memory 73 of the merchant server 51 using a drive mechanism associated with the computer-readable medium, such as a floppy or CD-ROM drive. Finally, memory 73 stores a Web server component 78 for handling requests for stored information received via the Internet and the WWW.

FIG. 5 depicts several of the key components of the commerce gateway 52. Those of ordinary skill in the art will appreciate that the commerce gateway 52 includes many more components than those shown in FIG. 5. However, it is not necessary that all of these generally conventional components be shown in order to disclose an illustrative embodiment for practicing the present invention. As shown in FIG. 5, the commerce gateway 52 is connected to the LAN 44 via a network interface 80. Those of ordinary skill in the art will appreciate that the network interface 80 includes the necessary circuitry for connecting the commerce gateway 52 to the LAN 44 and the firewall 55, and is constructed for use with the TCP/IP protocol, the bus network configuration of the LAN 44, and the particular type of coupling medium.

The commerce gateway 52 also includes a processing unit 81, a display 82, and a memory 83. The memory 83 generally comprises a random access memory (RAM), a read-only memory (ROM), and a permanent mass storage device, such as a hard disk drive, tape drive, optical drive, floppy disk drive, or combination thereof. The memory 83 stores the program code and data necessary for authorizing a merchant server 51 to supply products to consumers and obtaining payment for the products via a credit processing server 53 in accordance with the present invention. More specifically, the memory 83 stores a transaction server component 84 formed in accordance with the present invention for authorizing a merchant to supply the ordered product and obtaining payment for the ordered product from the credit processing server 53. Also stored in memory 83 is an enrollment server component 89 formed in accordance with the present invention for determining the credit worthiness of a consumer applicant. An account identification container generator component 88 is also stored in memory 83 for determining an internal account identification.

Also stored in the memory 83 is a credit processing server adapter component 86 for communicating with a credit processing server 53 described below. It will be appreciated that the transaction server component 84, the credit processing server adapter component 86, the account identification container generator component 88, and the enrollment server component 89 may be stored on a computer-readable medium and loaded into memory 83 of the commerce gateway 52 using a drive mechanism associated with the computer-readable medium, such as floppy or CD-ROM drive. The memory 83 also stores a Web server component 87 for handling requests for stored information received via the Internet 40 and the WWW.

FIG. 6 depicts several of the key components of the credit processing server 53. Those of ordinary skill in the art will appreciate that the credit processing server 53 includes many more components than those shown in FIG. 6.

However, it is not necessary that all of these generally conventional components be shown in order to disclose an illustrative embodiment for practicing the present invention. As shown in FIG. 6, the credit processing server 53 is connected to the LAN 44 via a network interface 90. Those of ordinary skill in the art will appreciate that the network interface 90 includes the necessary circuitry for connecting the credit processing server 53 to the LAN 44 and the firewall 55, and is constructed for use with the TCP/IP protocol, the bus network configuration of the LAN 44, and the particular type of coupling medium.

The credit processing server 53 also includes a processing unit 91, a display 92, and a memory 93. The memory 93 generally comprises a random access memory (RAM), a read-only memory (ROM), and a permanent mass storage device, such as a hard disk drive, tape drive, optical drive, floppy disk drive, or combination thereof. The memory 93 stores the program code and data necessary for authorizing and securing payment for products purchased using a virtual payment card in accordance with the present invention. More specifically, the memory 93 of the credit processing server stores credit processing sub-systems including: an account/billing sub-system 94 for billing a consumer for products purchased using a virtual payment account; a payment processing sub-system 95 for communicating with a financial institution 59 in order to process payments received for purchases made using a virtual payment account; and an account enrollment sub-system 96 for determining the credit limit for an applicant as determined by information received from one or more credit bureaus 58. Also stored in memory 93 are an account database 97 and a financial database 98 used to store data required for the account/billing sub-system 94, the payment processing sub-system 95, and the account enrollment sub-system 96 to perform their required functions. It will be appreciated that the account/billing sub-system 94, the payment processing sub-system 95, the account enrollment sub-system 96, the account database 97 and the financial database 98 may be stored on a computer-readable medium and loaded into memory 93 of the credit processing system using a drive mechanism associated with the computer-readable medium, such as floppy or CD-ROM drive. It will also be appreciated that the account/billing sub-system 94, the payment processing sub-system 95, and the account enrollment sub-system 96 can comprise, either in full or in part, existing, traditional card payment systems.

FIGS. 3-6 depict key components of the consumer computer 50, merchant server 51, commerce gateway 52, and credit processing server 53 shown in FIG. 2 of one embodiment of the present invention. It will be appreciated that many other implementations and variations are possible. For example, one or more of the credit processing sub-systems 94, 95, 96 could be included in the commerce gateway 52 instead of in the card processing server 53. Alternatively, each of the credit processing sub-systems 94, 95, 96 of the credit processing server could be in a separate server. Further, additional commerce gateways 52 and credit processing servers 53 may be located on the LAN 44 or elsewhere on the Internet 40.

Applying for a Virtual Payment Account

The virtual payment system of the present invention is a closed system that provides consumers a secure method for purchasing products over the Internet. The closed system includes only a registered consumer's computer 50, a registered merchant server 51, the commerce gateway 52 (administered by the provider of the virtual payment system) and the credit processing server 53 (which can also be administered by the provider of the virtual payment system). Since the account information necessary for charging the consumer for the purchase is already in the possession of the commerce gateway 52 and the credit processing server 53, the closed system of the present invention allows registered consumers to purchase products from registered merchants without transferring sensitive account information to the merchants over the Internet.

Figure 7:
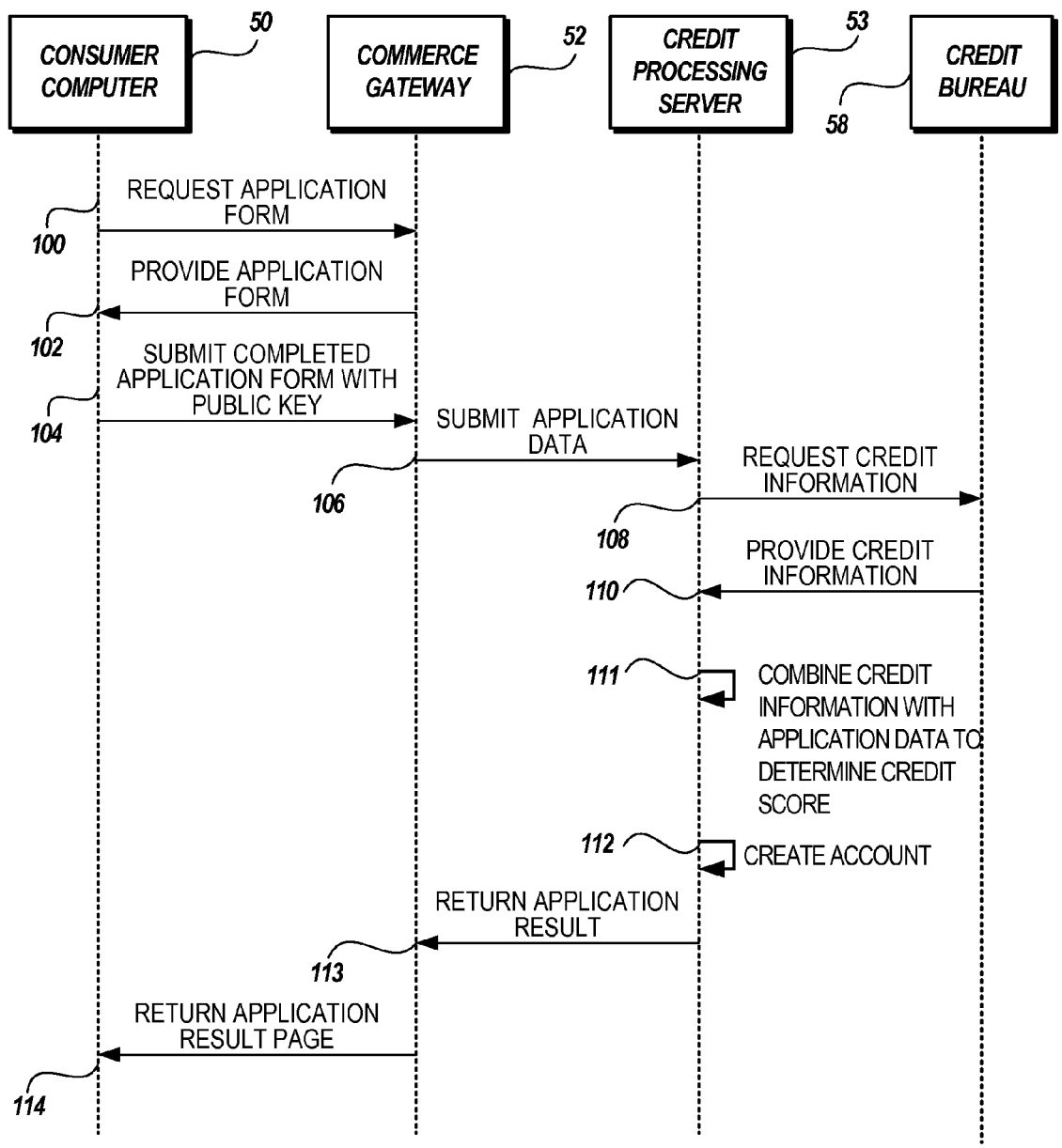
FIG. 7 is a diagram illustrating the actions taken by the consumer's computer, the commerce gateway, the credit processing server, and a credit bureau to create a virtual payment account for a consumer.

In order to become a member of the virtual payment system of the present invention, a consumer becomes a registered user by obtaining a virtual payment account. FIG. 7 illustrates the actions taken by the consumer's computer 50, the commerce gateway 52, the card processing system 53, and the credit bureau 58 to create a virtual payment account for a consumer. The interactions of the various components are illustrated and described in detail later for various transactions performed by the present invention with reference to the flow diagrams shown in FIGS. 12-13, 15-22 and 24-25. The process of applying for a virtual payment account is initiated when a consumer requests an application form via the Internet using the Web browser 64 installed on the consumer's computer 50. The consumer may apply for a virtual payment account directly from a virtual payment account Web site located at the commerce gateway 52 or indirectly from a registered merchant site located at the merchant server 51. Once the request for the application form 100 is received by the commerce gateway 52, the commerce gateway 52 provides consumer computer 50 the application form 102 so that the consumer can complete the form displayed in the Web browser of the consumer computer 50.

Upon completion of the application form, the consumer computer 50 submits the completed application form and a public key 104 to the commerce gateway 52. The public key is used to decrypt messages encrypted using a private key and to encrypt messages that can by decrypted using the private key, as described later. The commerce gateway 52 then submits the application data 106 from the completed form to the credit processing server 53 for account and credit limit authorization. The credit processing server 53 requests credit information 108 about the consumer from a credit bureau 58. As noted above, the credit bureau 58 in the actual embodiment of the present invention illustrated herein is a server 58 administered by a credit bureau in point-to-point communication with the credit processing server 53. Hence, the credit processing server 53 requests the desired credit information electronically, e.g., via appropriate database queries, etc., from the credit bureau 58.

Returning to the illustrated embodiment, the credit bureau 58 provides the requested credit information 110 to the credit processing server 53 via the point-to-point connection with the credit processing server. The credit processing server 53 then evaluates the application and credit information by combining the credit information received from the credit bureau 58 with application data in order to determine a credit score 111. If the score exceeds a certain threshold, a credit limit is set, and the virtual payment account is created 112. If the score falls below the threshold, a virtual payment account is still created 112, however, all purchases must be prepaid, and the account information is forwarded to a customer service representative for review for a possible later grant of credit. Once the virtual payment account is created, the credit processing server 53 returns the result of the evaluation 113, e.g., approval/denial, prepaid account only, credit limit, etc., to the commerce gateway 52 via the Internet. Finally, the commerce gateway 52 sends an application result page 114 to the consumer computer 50 for display via the consumer computer's Web browser 64.

Figure 8B:
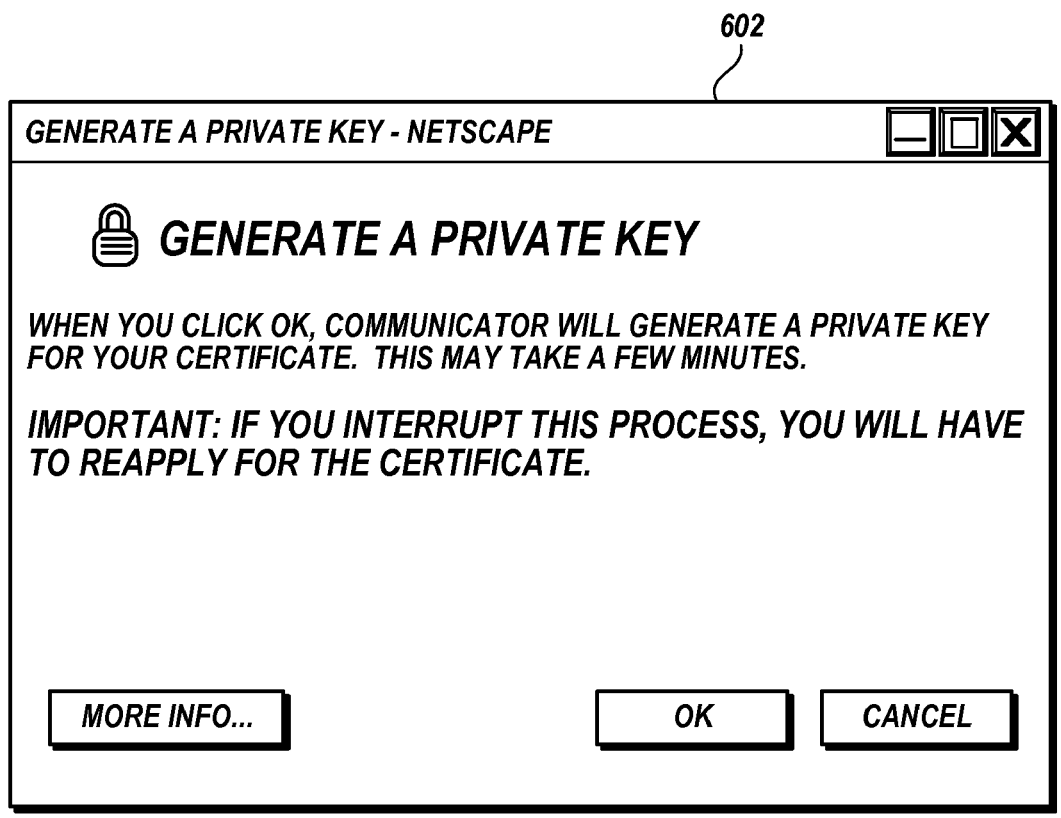

FIGS. 8A-8E are exemplary Web pages provided to the consumer by the Web browser 64 of the consumer's computer 50 in connection with applying for a virtual payment account as described above. Using the Web page 600 shown in FIG. 8A, the consumer enters identification information including his or her name and e-mail address and submits the information to the consumer authenticator 65 by clicking "continue." The consumer authenticator 65 on the consumer's computer 50 then generates a private key and a corresponding public key, which are used to encrypt/decrypt messages, as described later, in order to provide increased security for the registered users of the virtual payment system of the present invention. A private key confirmation display page 602 as shown in FIG. 8B is then displayed on the consumer's computer 50. Next, the Web pages 604 shown in FIGS. 8C-8D for the application form are displayed to the consumer via the Web browser. The consumer fills out the application form with the appropriate application data on-line. Alternatively, the consumer can request the application on a printed form and submit the printed form via facsimile or regular mail, in which case a customer service representative will enter the information into the account database 97 of the credit processing server 53 via the administrative user computer 54. The application data includes information such as social security number and income that will be used to determine a credit limit for the consumer. Information entered by the consumer in the application form is also used for demographic purposes. For example, banner advertisements can be displayed via the Web browser 64 on the consumer computer 50 and can be targeted to the consumer based on demographic information, such as the consumer's age and geographic location.

After the consumer completes the application form 604 shown in FIG. 8C-8D and the application is processed by the credit processing server 53, a Web page 606 as shown in FIG. 8E is transferred to and displayed by the consumer computer's Web browser 64, which notifies the consumer of the results of the application process, i.e., account approval and details of his or her virtual payment account, including the account credit limit.

Customizing and Modifying a Virtual Payment Account

Once a virtual payment account has been approved and a credit limit set as described above, the account can be customized by the consumer. FIGS. 9A-9D illustrate an exemplary set of Web pages downloaded from the commerce gateway 52 and displayed by the Web browser 64 of the consumer's computer 50 for customizing the consumer's virtual payment account. FIG. 9A illustrates a Web page 608 for main account customization. As shown in FIG. 9A, the consumer may customize his or her virtual payment account to be either a prepaid account and/or a credit account which can be funded via a bank, such as via a consumer's checking or savings account. The virtual payment account also allows the consumer to earn reward or loyalty points, which can later be used, for example, to make a payment for a purchase, to receive merchant discounts, to purchase frequent flyer miles, etc. As shown in FIG. 9A, the consumer has the option of accumulating loyalty points for later use or obtaining discounts on shipping. It will be appreciated by those of ordinary skill in the art that reward points can be earned by the consumer and applied to his or her virtual payment account in a myriad of different ways and the examples shown and described are merely meant to be illustrative.

As shown in FIGS. 9B-9D, the consumer may also customize sub-accounts for his or her own use, or for use by a business partner, spouse and/or children. As will be described in more detail below, the consumer may then impose his or her own spending limits on the sub-accounts. In one actual embodiment, reward points accrue in the main account so that the consumer can transfer the reward points to sub-accounts. It will be appreciated that in other embodiments, reward points could accrue to individual sub-accounts, if the consumer so desires. The illustrated embodiment also allows a consumer to select a family package, a business package, or to create a custom package of sub-accounts. As will be readily recognized by those of ordinary skill in the art, the consumer may be provided with any number, type or combination of sub-accounts depending on the desires of those providing and administrating the virtual payment system of the present invention.

The consumer can add sub-accounts (e.g., supplemental users, young shoppers, etc.) via the Web pages 610, 612 shown in FIGS. 9C and 9D. Sub-accounts can be customized for young shoppers as shown in FIG. 9D, for example, by setting spending limits for the young shopper and identifying only those merchant Web sites from which the young shopper can purchase products.

Figure 10:
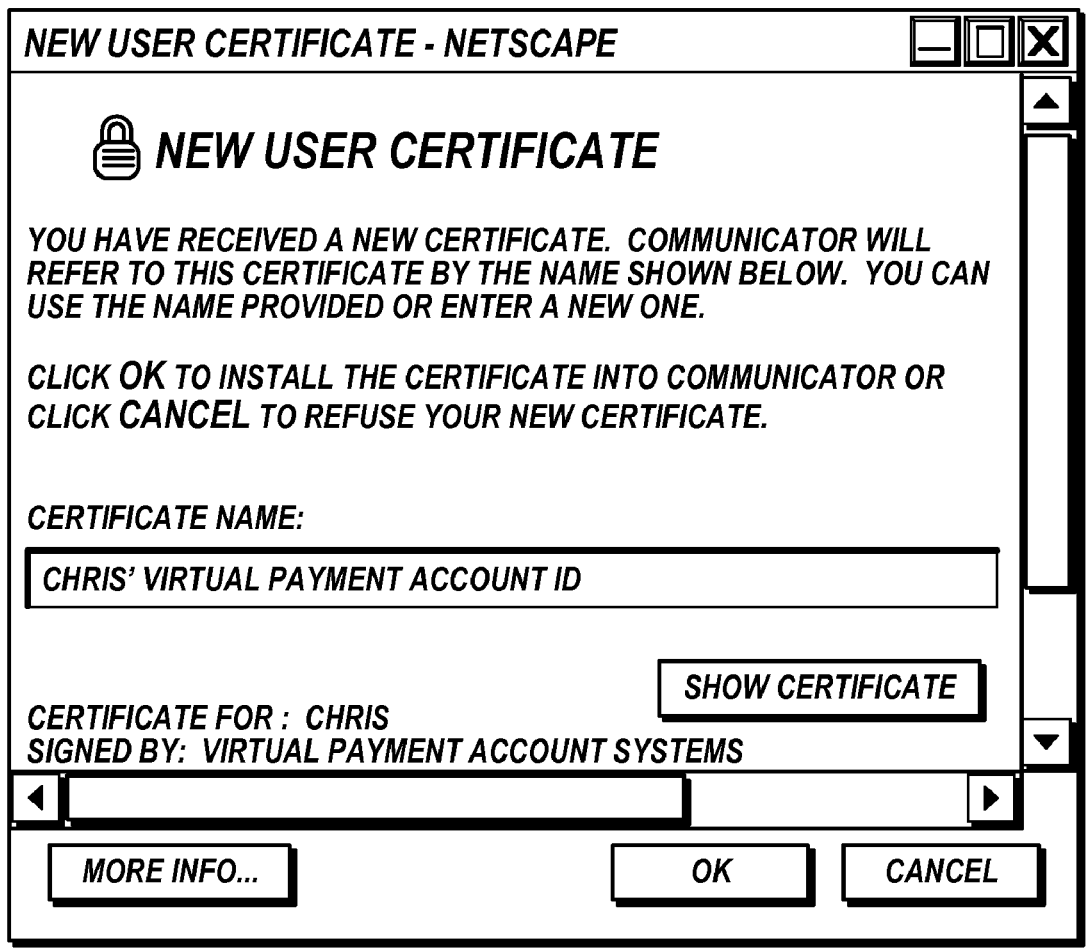
FIG. 10 illustrates a display notifying the consumer of a digital certificate created in response to a successful creation and customization of a virtual payment account in accordance with the present invention.

As will be described in more detail below, once the virtual payment account has been authorized and customized, a digital certificate is transferred by the commerce gateway 52 and installed on the consumer computer 50. The consumer is notified of the installation by a new user certificate page 614 displayed on the consumer's computer 50 as shown in FIG. 10. The digital certificate is then used in subsequent transactions to uniquely identify the consumer as a registered holder of a virtual payment account. In an actual embodiment of the present invention, a consumer or merchant is identified as a registered user of the virtual payment system by verifying a digital signature which is a piece of data including a digital certificate identification encrypted using the private key provided by the consumer computer 50 or the merchant computer 51 when applying for an account, and the digital certificate identification that is generated by the commerce gateway 52 when the virtual payment account is opened for the participant, i.e., the newly registered consumer or merchant. The digital certificate identification is actually submitted by the consumer computer 50 or merchant server 51 in the context of the transaction, even though the commerce gateway 52 originally generated these credentials.

It will be appreciated that several levels of security can be imposed on on-line transactions. Moving from the lowest level to the highest level, there can be: (1) no security restrictions imposed; (2) minimal security, such as account name and password verification; (3) intermediate security, such as a digital certificate or private key; (4) greater security, such as a digital signature composed of the combination of a digital certificate encrypted using a private key; or (5) maximum security, such as a digital signature and additional access controls, such as an account number, a last purchase verification, hash function, a message digest, or some combination thereof. As will be described later, in the actual embodiment of the virtual card system described herein, the term "digital certificate" is used to describe the authorization used; however, it will be appreciated that a higher level of security such as a digital signature, or a digital signature with additional access controls may be desired in order to ensure the highest level of security for all parties involved (i.e., the consumer, the merchant, the commerce gateway, and the credit processing server) in virtual payment account transactions.

It will also be appreciated that a similar process is performed for a merchant to become an authorized or registered merchant. In one embodiment, a merchant can apply to become a member by completing an application form on-line. In another embodiment, a merchant applies to become a participant of the system using a more traditional manual application procedure. In yet another embodiment, some combination of an on-line and manual process is used. It will be appreciated that if the merchant application process is performed in whole or in part on-line, a Web browser component (not shown in FIG. 4) is used to display Web pages on the merchant's computer display 72. The merchant forms a contract with the provider of the commerce gateway 52. This contract includes terms such as the billing period and the fee that will be paid to the commerce gateway provider. Since a merchant is selling a product to a consumer who has a virtual payment account, the merchant will not have sub-accounts in the same sense that a consumer has sub-accounts. However, a merchant selling different types of data can have different accounts. For example, a book store may have a general account and one or more restricted accounts, for example, the restricted accounts may prohibit sales of adult products to minors. This can be in the form of a rating system (e.g., G, PG, PG13, NC17, R, etc.). In a similar manner to the consumer application process, once a merchant has been approved and the merchant account customized, a digital certificate is installed on the merchant's computer 51 to identify the merchant as a registered merchant in the virtual payment system. The digital certificate is used in combination with a private key generated by the merchant server 51 and a public key generated by the merchant server and sent to the gateway 52 to encrypt/decrypt messages for greater security.

It will be appreciated, as described earlier, that a merchant can apply for a "consumer" account. In other words, a merchant can purchase products as the owner of a virtual payment account.

Ordering Products

Figures 11A, 11B:
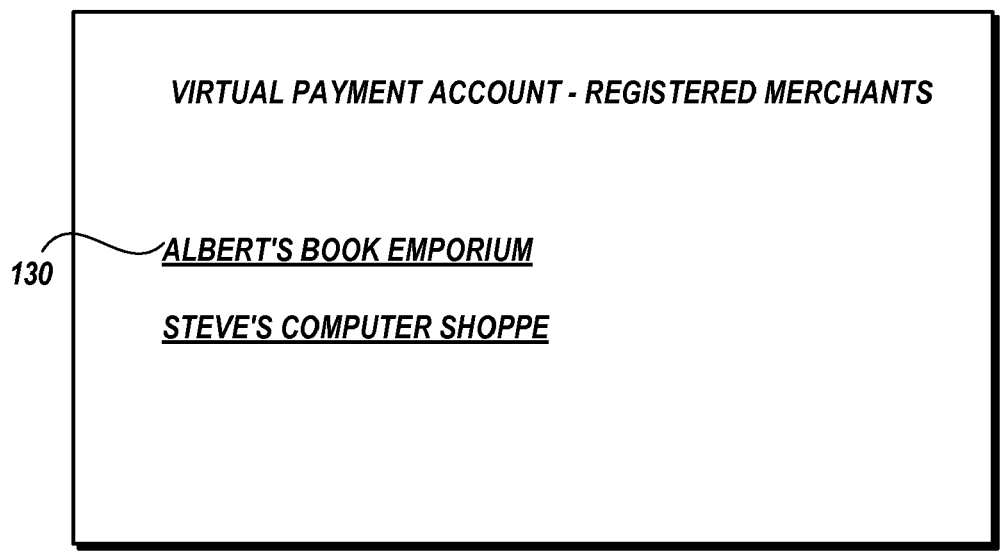
FIGS. 11A-11F are exemplary Web pages used by a consumer to purchase goods, services and/or content in accordance with the present invention.

Once a consumer has created and customized his or her virtual payment account, he or she can immediately order products via the Internet if he or she was granted credit during the account application process. If, however, the consumer's virtual payment account is only a prepaid account, prepayment must be made before the consumer can order products. Alternatively, the consumer with only a prepaid account can order products, however, shipment of the product will be held until the prepaid account is sufficiently funded to cover the purchase. More specifically, any registered consumer can order products directly from the Web site of any registered merchant. It will be appreciated that a merchant can be an auction Web site, in which a consumer uses his or her virtual payment account to pay for the goods, services and/or content purchased from the auction Web site. In one actual embodiment of the present invention, the commerce gateway 52 transfers to, and the Web browser 64 of the consumer computer 50 displays, a Web page 150 providing a list of links as shown in FIG. 11A to registered merchants belonging to the virtual payment system. Selection of a merchant link, such as "Albert's Book Emporium" 130, from the Web page 150 in the consumer's Web browser will then cause download and display of the merchant's Web site associated with that link. In the alternative, the consumer may "surf the Web" and visit a registered merchant's Web site, such as "Albert's Book Emporium," using the Web browser 64. In either case, once the consumer visits a registered merchant's Web site, the consumer may order and pay for products offered from that Web site using his or her virtual payment account.

Returning to the previous example, a consumer using consumer computer 50 and Web browser 64 may retrieve the Web page 160 shown in FIG. 11B from the merchant Web site fictitiously known as "Albert's Book Emporium." The consumer makes a selection of a particular book by manipulating a graphics cursor with a pointing device, such as a mouse above the selection and "single-clicking." It will be appreciated that other pages, for example a query page in which the consumer requests books by a specified author, may be displayed. It will also be appreciated that the Web page 160 shown in FIG. 11B is a simplified example. It is common for a merchant site to allow a consumer to select multiple products and place them in a "shopping cart." The consumer can then view the items in the cart and, if desired, remove items from the cart. Once the consumer has selected the desired items for purchase, the consumer indicates a desire to purchase the selected items, for example, by clicking an "OK" or a "Buy" button. In the simplified example shown in FIG. 11B, the consumer selects an item, such as the book, "Moby Dick" 112 and presses the "Buy" button 163 to initiate the purchase transaction.

Figure 11C:
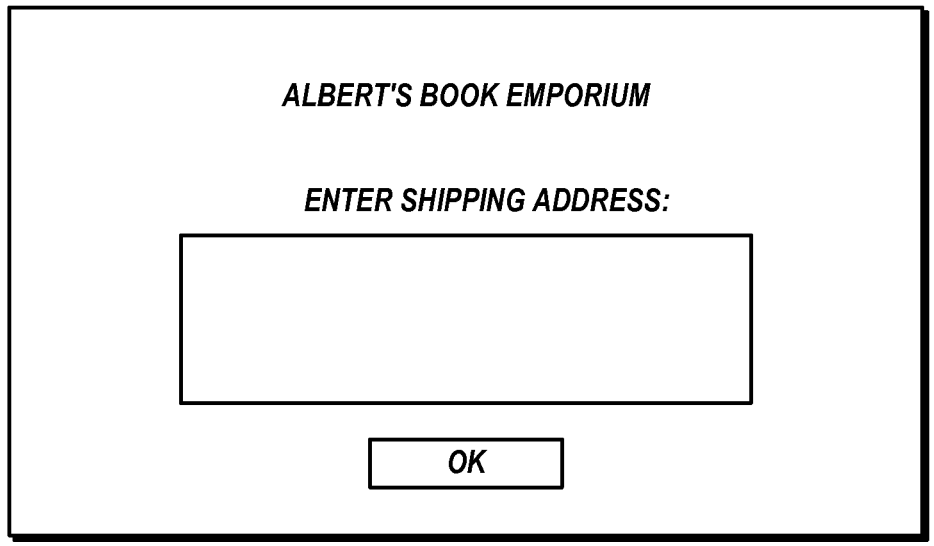
Figure 11D:
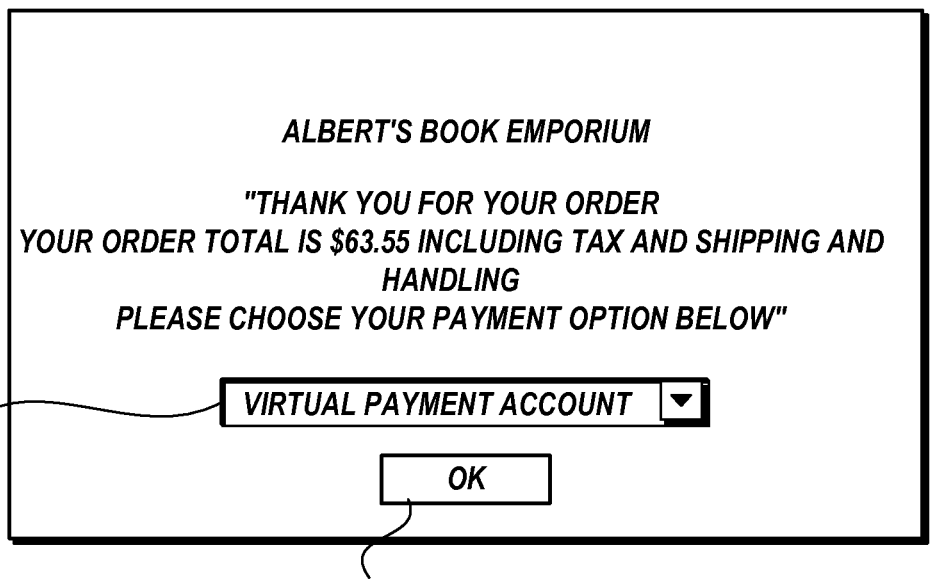
Figure 11E:
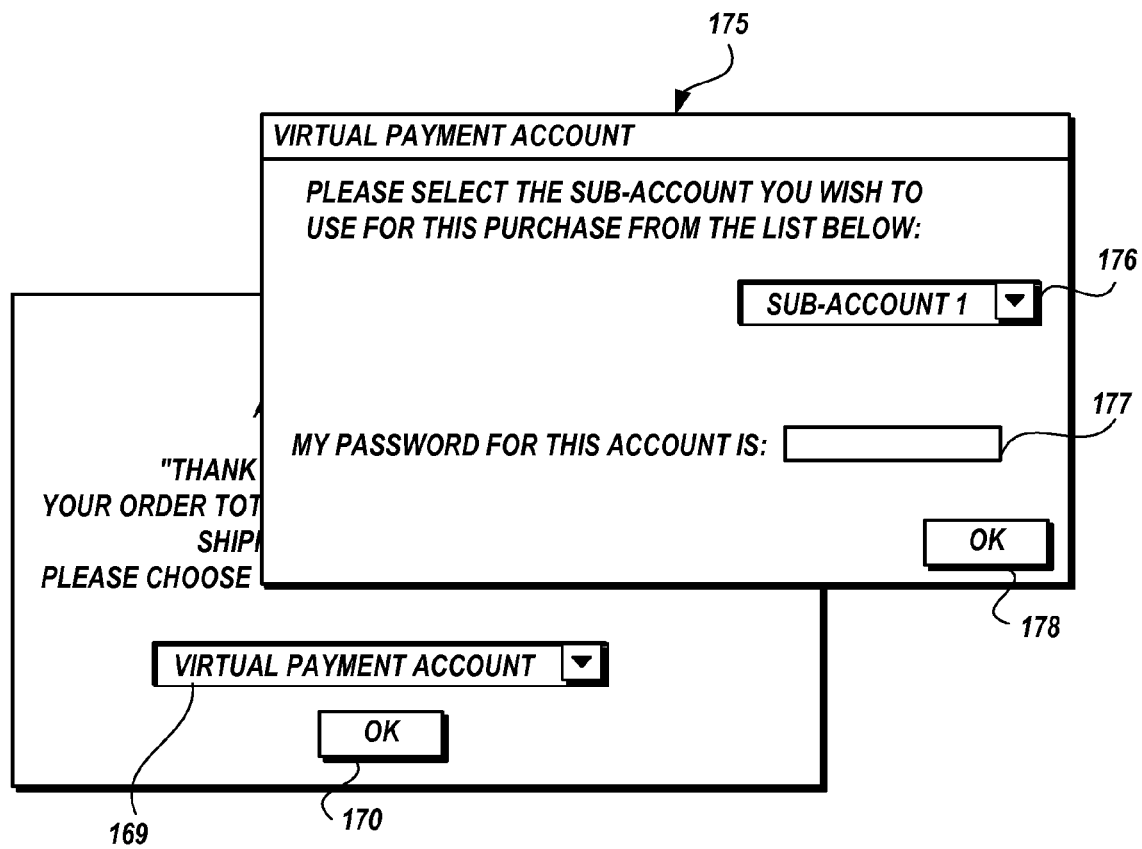
Figure 11F:
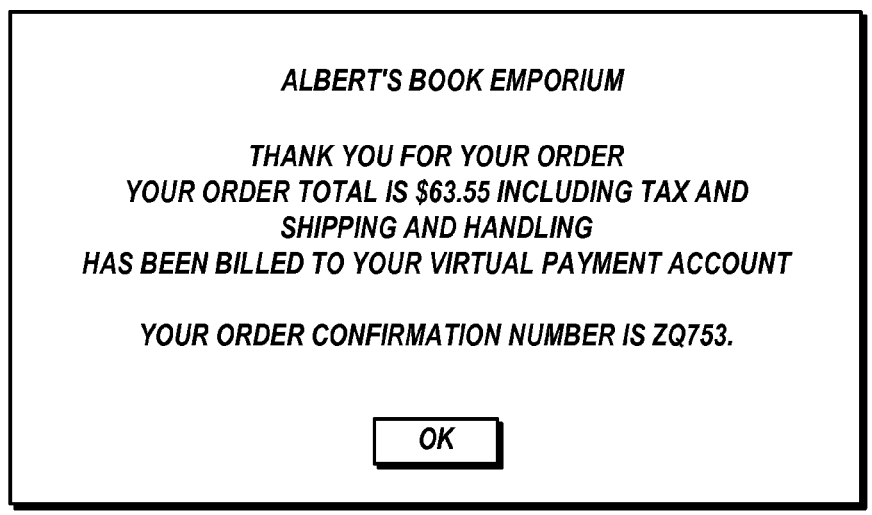

After initiating the purchase transaction, the merchant server 51 provides the Web browser 64 of the consumer's computer 50 with the Web page 165 shown in FIG. 11C which requests shipping information, such as a street address, from the consumer. In response, the merchant server 51 calculates the total cost of the order, including tax and shipping and handling, and provides the consumer with yet another hypertext document 166 as shown in FIG. 11D which includes various payment options, i.e., major credit cards, such as VISA® or MASTERCARD®, with electronic transmission of credit information. In accordance with the present invention, a virtual payment account option is also displayed as a payment option for registered merchants. As will be described in more detail below, if the consumer selects the virtual payment account option 169, the consumer will be presented with various virtual payment account options available to him or her, as shown in FIG. 11E, based on the customization of his or her accounts.

Figure 12:
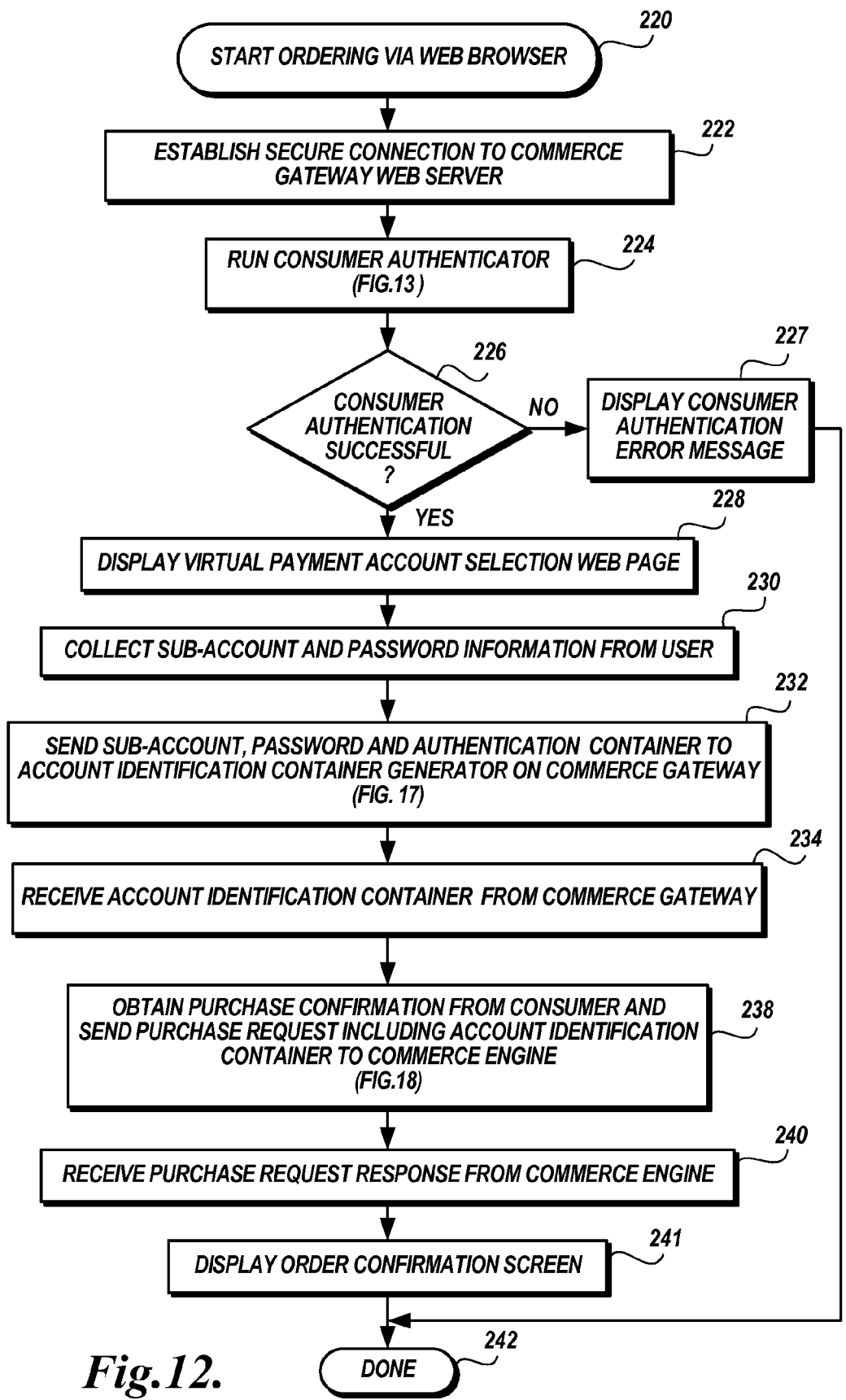
FIG. 12 is a flow diagram illustrating the logic used by the consumer's computer to order goods, services and/or content from the Internet using the Web browser.

FIG. 12 illustrates the logic implemented by the Web browser 64 installed on the consumer computer 50 when the virtual payment account option 169 is selected. The logic begins in a block 220 and proceeds to a block 222 where a secure connection between the consumer computer 50 and commerce gateway 52 is established. In an actual embodiment of the present invention, the Secure Socket Layer (SSL) protocol is used for establishing a secure connection. This technology uses public key encryption incorporated into a Web browser, such as Netscape's NAVIGATOR® Web browser and Netscape's commerce servers, to secure the information being transferred over the Internet. SSL uses the digital certificate installed on the consumer's computer 50 to authenticate the consumer as a registered participant before making the connection. However, it will be appreciated that SSL can still be used in an unauthenticated mode if there is no digital certificate present. The logic then proceeds to a block 224 where a consumer authenticator component 65 on the consumer computer 50 is executed. It will be appreciated that the consumer authenticator component 65 can also be included, in part or in whole, in the Web browser 64. The consumer authenticator component 65 is shown in more detail in FIG. 13 and described next.

The consumer authenticator 65 determines whether a consumer is a registered holder of a virtual payment account or put another way, a registered participant in the closed virtual payment system of the present invention. The logic of FIG. 13 begins in a block 243 and proceeds to a block 244 where an authentication request and container are received from the Web browser 64. The container includes: transaction information, such as purchase detail; identification of the parties, such as a consumer identification which identifies the consumer, e.g., the digital certificate previously issued to the consumer when he or she created the virtual payment account as described above; and a merchant identification, e.g., the digital certificate issued to the merchant upon creation of a merchant account; and context, such as transaction date and time. It will be appreciated that the container is initially empty, and data is then added to the container by various components. As stated earlier, embodiments of the invention implement the consumer authenticator in the Web browser 64. In such embodiments, a cookie is used to implement the request and container. On the World Wide Web, a cookie is a block of data that a Web server stores on a client system. When a user returns to the same Web site, the browser sends a copy of the cookie back to the server. Cookies are used to identify users, to instruct the server to send a customized version of the requested Web page, to submit account information for the user, and for other administrative purposes. A cookie includes user-defined data. In the case of the present invention, the user-defined data includes the container described above.

Next, in decision block 246, a test is made to determine if a digital certificate is installed on the consumer computer 50. The digital certificate is but one manner of digital identification. It will be appreciated that other methods of digital identification can be used. If the digital certificate is installed, the digital certificate identification is inserted into the authentication container and the authentication request and container are returned to the Web browser in blocks 248 and 250. The container can be any one of a variety of data formats, for example, one embodiment of the present invention uses a cookie. In an actual embodiment of a present invention, a private key generated by the consumer's computer is also inserted into the container. The private key is never transmitted anywhere in the virtual payment system of the present invention. The combination of the private key and the digital certificate provides a digital signature, and therefore provides a heightened level of security to the consumer authentication process. A digital signature is a piece of data that is known to all parties, and is processed by a cryptographic algorithm and a private key. The resulting signature can be decrypted only by an associated public key. Thus, the identify of the originator of the piece of data can be confirmed. Due to the high load requirements of public key/private key encryption, a message is typically "signed" by generating a hash or message digest of the message resulting in a need to only process a small amount of data using the algorithm. The hash code is a number that is based on the information within the message, e.g., consumer identification, merchant identification, transaction (for example, purchase) details, and can be generated by any party that knows the algorithm. The hash code is then encrypted using the private key of the message originator, and can only be decrypted to the correct hash code using the correct public key. It will be appreciated that digital certificate as used herein refers to an authentication identify which is recognized by the provider of the virtual payment account that adheres to the provider's non-repudiated purchase policies, which can be a digital certificate, a private key, a digital signature, or a digital signature with additional access controls. The logic of FIG. 13 then ends in a block 262.

If, however, in decision block 246 it is determined that there is not a digital certificate installed on the consumer computer 50, the logic proceeds to a decision block 252 where a test is made to determine if "certificate not present" processing should be performed. Certificate not present processing allows a consumer to manually enter identification information when a digital certificate is not present. The identification information can include information such as an e-mail address, a password and personal information, for example, a mortgage payment amount. If the result of decision block 252 is positive, the logic proceeds to a block 254 where a certificate not present authorization Web page 700 as shown in FIG. 14 is displayed on the consumer computer 50 by the Web browser 64. The logic then moves to a block 256 where the information entered by the consumer in the certificate not present authorization Web page is used to authenticate the consumer. The authentication status is then returned to the Web browser. In another embodiment of the present invention, "roaming" certificates allow a consumer to make purchases from different computers without requiring the consumer to perform certificate not present processing. The logic of FIG. 13 then ends in block 262.

Figure 13:
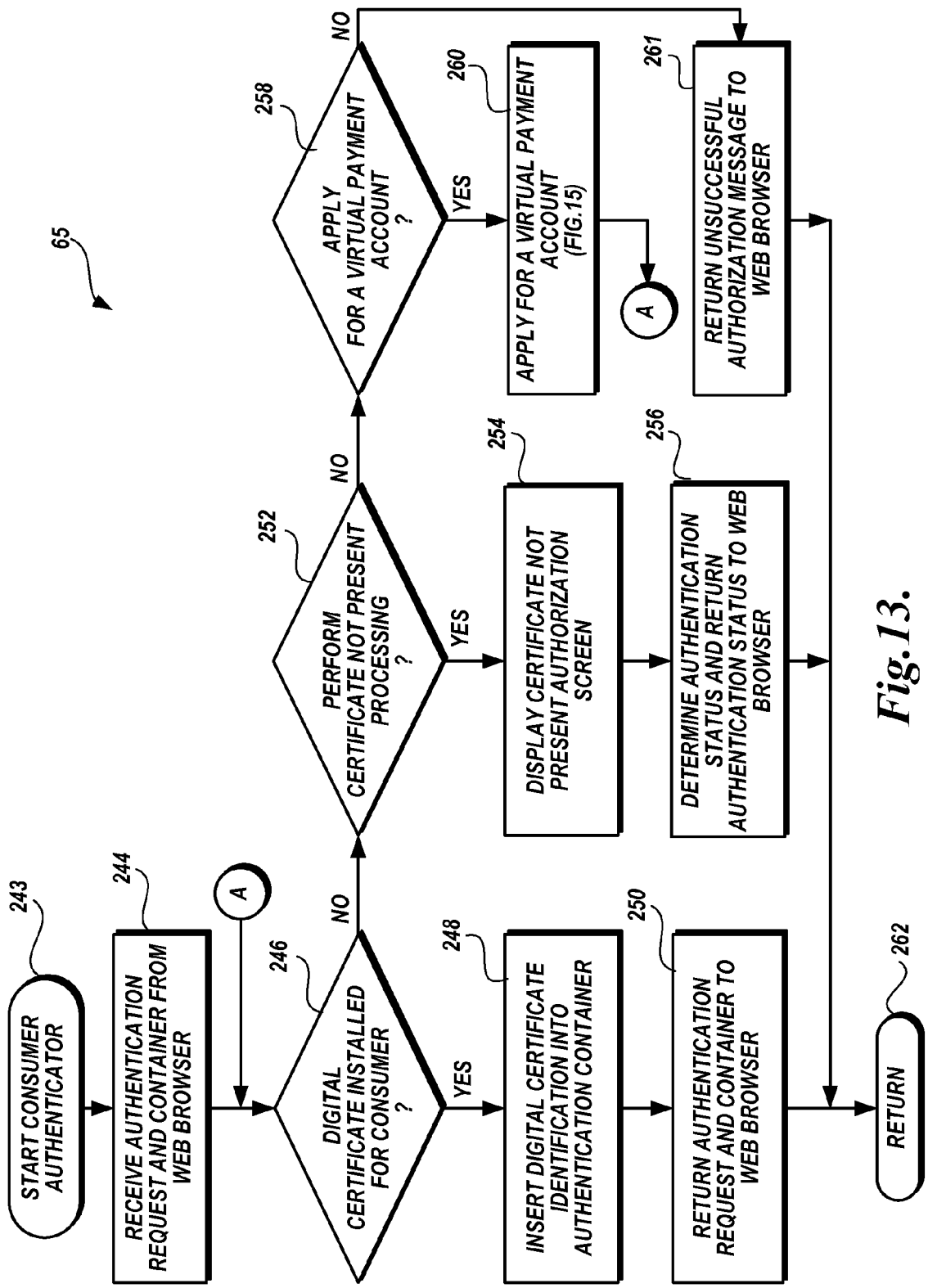
FIG. 13 is a flow diagram illustrating the logic used by a consumer authenticator of the consumer computer shown in FIG. 3 to validate that the consumer is a registered virtual payment account participant.
Figure 14:
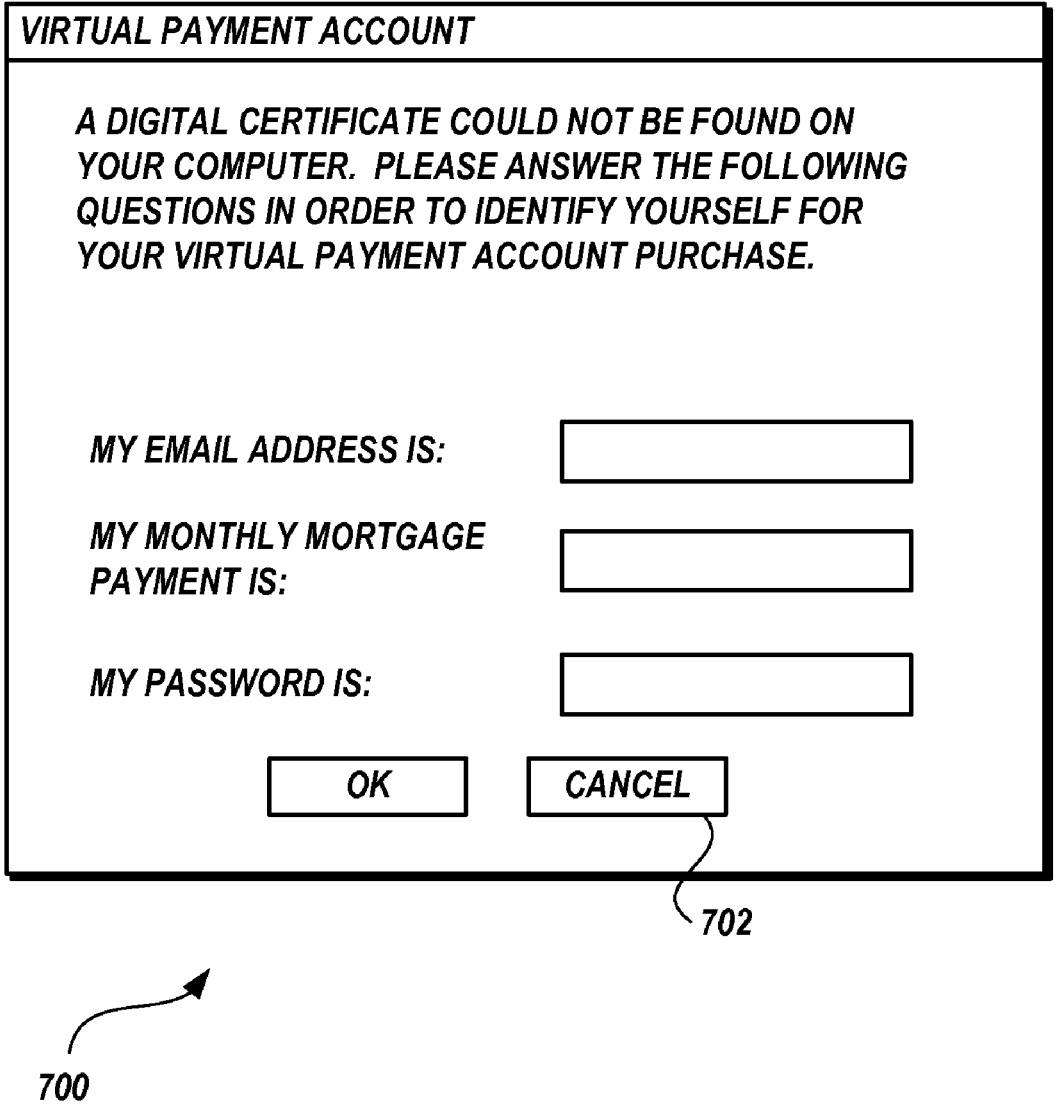
FIG. 14 is an exemplary Web page for performing certificate not present processing in accordance with the present invention.
Figure 15:
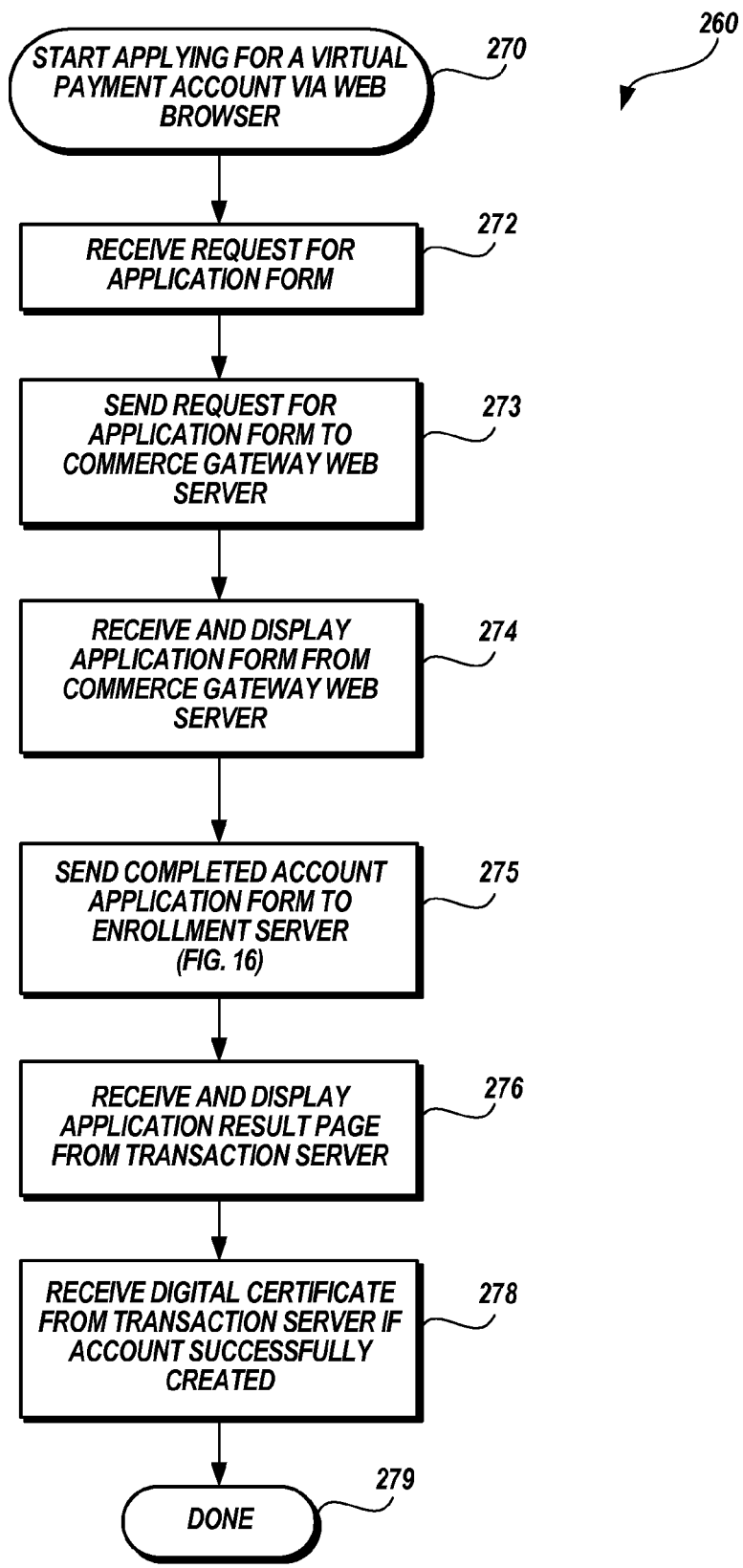
FIG. 15 is a flow diagram illustrating the logic used by the consumer's computer to apply for a virtual payment account using the Web browser.

If there is no digital certificate installed (no in decision block 246) and certificate not present processing is not going to be performed, for example by a user selecting "cancel" 702 in the certificate not present authorization Web page 700 shown in FIG. 14 (no in decision block 252), the consumer likely does not have a virtual payment account. Accordingly, the logic of FIG. 13 proceeds to a decision block 258 where a test is made to determine if the consumer wishes to apply for a virtual payment account. If the consumer wishes to apply for a virtual payment account, the logic proceeds to a block 260, in which the consumer is allowed to apply for a virtual payment account as shown in FIG. 15 and described next. Otherwise, the consumer authenticator 65 returns an unsuccessful authorization message to the Web browser 64 in a block 261 and the logic ends in block 262.

FIG. 15 illustrates the logic implemented by the Web browser 64 when a consumer applies for a virtual payment account. It will be appreciated that applying for a virtual payment account can be invoked by a consumer requesting an account directly from the commerce gateway 52 or by a consumer who is not registered attempting to order a product from a registered merchant. In either case, the logic for applying for a virtual payment account via a Web browser 64 begins in a block 270 and proceeds to a block 271 where a request for an application form is received by the Web browser 64. The logic then proceeds to a block 272 where a private key is generated and stored on the consumers computer. A corresponding public key is also generated. The private key is used in conjunction with a public key to encrypt and decrypt account identifications. This provides security in that the private key is known only by the consumer's computer 50. Next in a block 273, the request for an application form is sent to the commerce gateway Web server 87, along with the public key that is used in conjunction with the private key for encryption and decryption of account identifications as described above. The requested application form is then received from the commerce gateway Web server 87 and displayed in the consumer's Web browser in a block 274.

Figure 16:
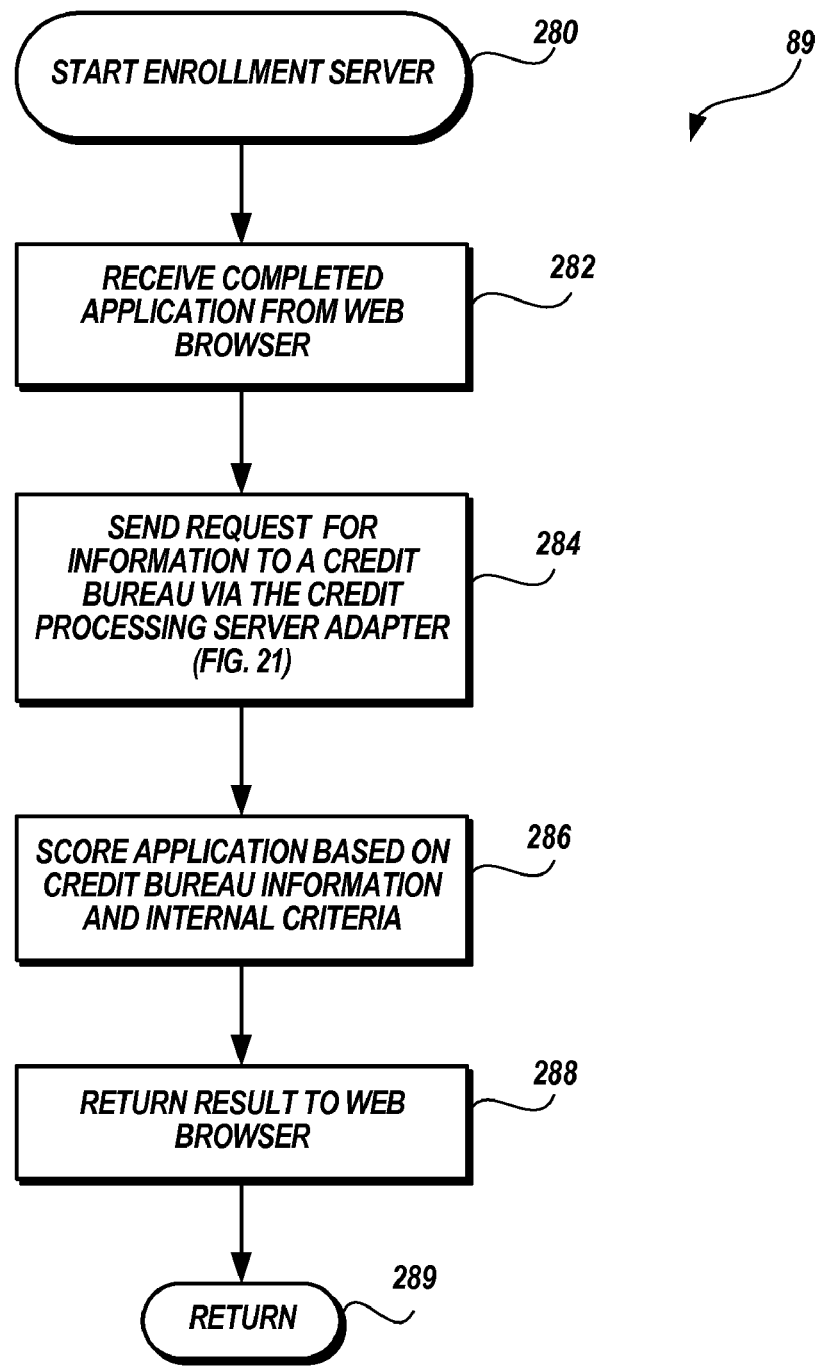
FIG. 16 is a flow diagram illustrating the logic used by an enrollment server of the commerce gateway shown in FIG. 5 to establish a new consumer account in accordance with the present invention.

Next, in a block 275, the completed account application form is sent to the commerce gateway 52 and processed by an enrollment server component 89 as shown in FIG. 16, and described next. In another embodiment, the transaction server component 84 which handles financial transactions also handles non-financial transactions, such as enrollment.

The logic of the enrollment server 89 shown in FIG. 16 begins in a block 280 and proceeds to a block 282 where a completed application form is received from the Web browser. Next, in a block 284 credit information, such as income, length of time with current employer, length of time at current residence, etc., is requested from a credit bureau 58 via the credit processing server adapter 86 as shown in FIG. 21 and described later with reference to a purchase authorization request.

Upon receipt of the credit information, the logic proceeds to a block 286 where the application is scored based on the credit bureau information in combination with internal criteria. The internal criteria provides a score for the various pieces of credit information. For example, incomes will be broken down into ranges, with a point value assigned to each range. Similarly points values will be assigned based on the time the applicant has lived at his or her current residence, etc. The points for each piece of credit information are combined to determine a score for the applicant. The score equates to the credit worthiness of the consumer and is used to determine if the applicant will receive a credit account (in addition to a prepaid account), and if so, to establish a credit limit for the applicant, i.e., consumer. Next, the result is returned to the Web browser in a block 288. The logic of FIG. 16 then ends in a block 289 and processing returns to FIG. 15.

Returning to FIG. 15, once a response is received from the enrollment server 89 in a block 276, a result page on the consumer's computer containing the response from the transaction server is displayed. In the case of applying for a virtual payment account, the result page provides details of the new account for the consumer, or contains a message informing the consumer that there was an error creating the account. If the account was successfully created, the enrollment server 89 will also send a digital certificate in a block 278. The logic of FIG. 15 of applying for a virtual payment account then ends in a block 279 and processing returns to FIG. 13.

While the logic of authenticating a consumer as shown in FIG. 13 and described herein uses a digital certificate as the primary means for authenticating a consumer, it will be appreciated that other methods are possible. For example, a lesser level of security could be employed, whereby a user could be required to enter identifying information, such as the information entered in "certificate not present" processing of blocks 254-256. Alternatively, a greater degree of security could be employed whereby a digital certificate is required, and "certificate not present" processing is not allowed. Or, an even greater level of security could be used requiring a digital signature.

Referring again to FIG. 13, after the consumer has applied for a virtual payment account, the logic returns to decision block 246 where the test to determine if a digital certificate is installed on the consumer computer 50 is repeated. Depending on the results of decision block 246, either blocks 248-250 or blocks 252-256 are repeated for the recent applicant of a virtual payment account. The logic then ends in a block 262.

Returning to FIG. 12, after consumer authentication is completed in block 224, the logic proceeds to a decision block 226, where a test is made to determine if the consumer authentication was successful. If not, the logic proceeds to a block 227 where an error message is displayed on the consumer computer 50 by the Web browser 64 notifying the consumer of the failed authentication. The logic of FIG. 12 ends in a block 242.

However, if the consumer was successfully authenticated, the logic proceeds to a block 228 where a virtual payment account selection Web page as shown in FIG. 11E is displayed. Included in the requested information of the virtual payment account selection Web page is an identification of the applicable account or sub-account to which the purchase should be applied. Next, in a block 230, sub-account 176 and password information 177 are obtained from the consumer from the information entered in the virtual payment account selection Web page 175 of FIG. 11E when the consumer indicates that the information has been entered by selecting "OK" 178. The logic of FIG. 12 then proceeds to a block 232 where the sub-account, password information, and an authentication container are sent to the commerce gateway 52 and processed by the account identification container generator 88 shown in FIG. 17 and described next.

Figure 17:
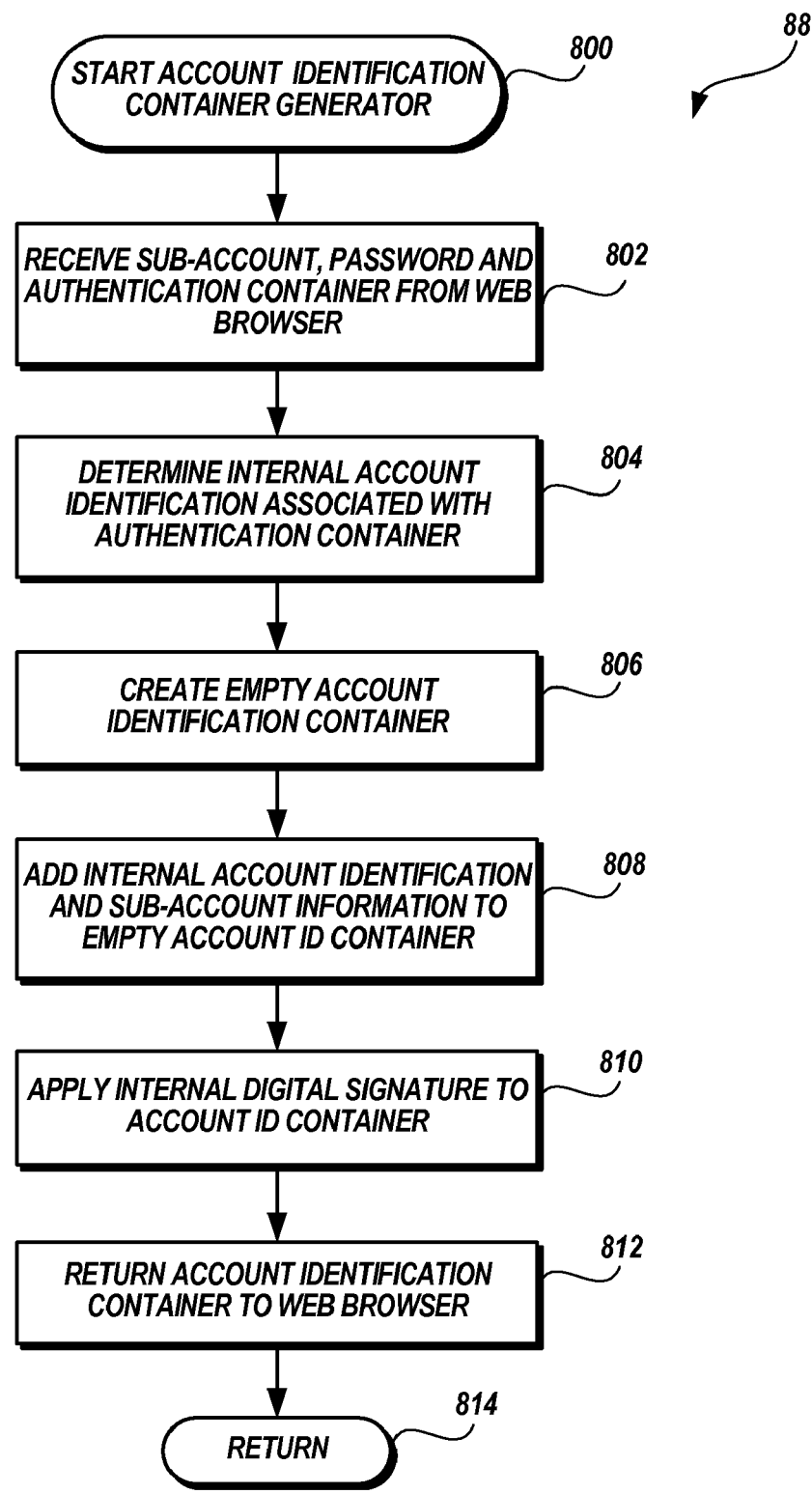
FIG. 17 a flow diagram illustrating the logic used by an account identification container generator of the commerce gateway shown in FIG. 5 to generate an account identification for a given transaction.

The logic of FIG. 17 begins in a block 800 and proceeds to a block 802 where the sub-account, password and authentication container are received from Web browser 64 of the consumer computer 50. The logic then proceeds to a block 804 where an internal account identification associated with authentication container is determined. An empty account identification container is then created in a block 806. Next, in a block 808, internal account identification and sub-account information is added to the empty account identification container. The logic then proceeds to a block 810 where an internal digital signature is applied to the account identification container. For example, message digest logic can be used by applying an algorithm that takes a variable length message and produces a fixed length digest as output using a one-way hashing algorithm that establishes the message as cryptographically secure. Finally, the account identification container is returned to the Web browser 64 in a block 812. The logic of FIG. 17 then ends, and processing returns to FIG. 12.

Figure 18:
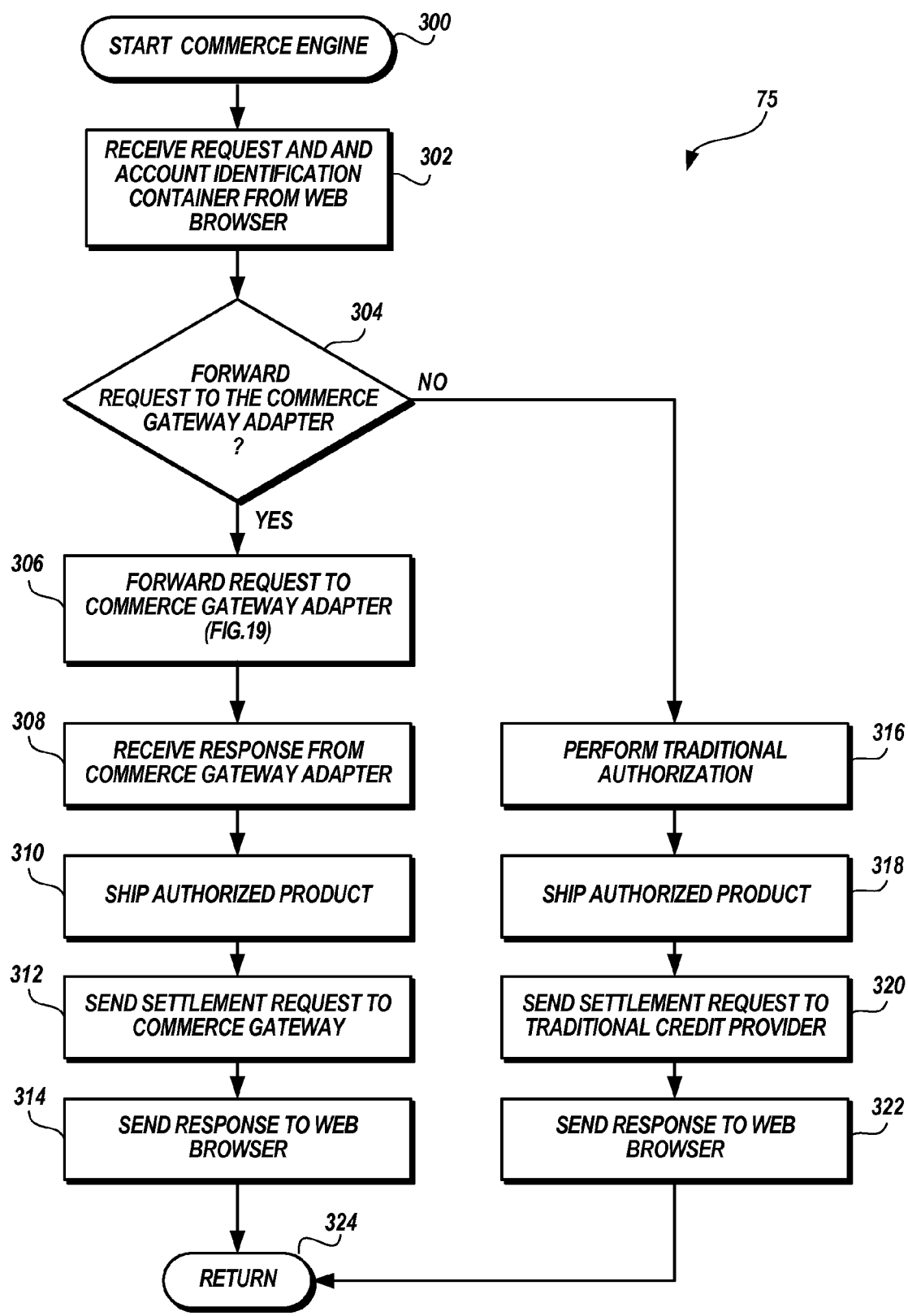
FIG. 18 is a flow diagram illustrating the logic used by a commerce engine of a merchant computer shown in FIG. 4 to provide for the ordering, shipment and payment of goods, services and/or content over the Internet.
Figure 19:
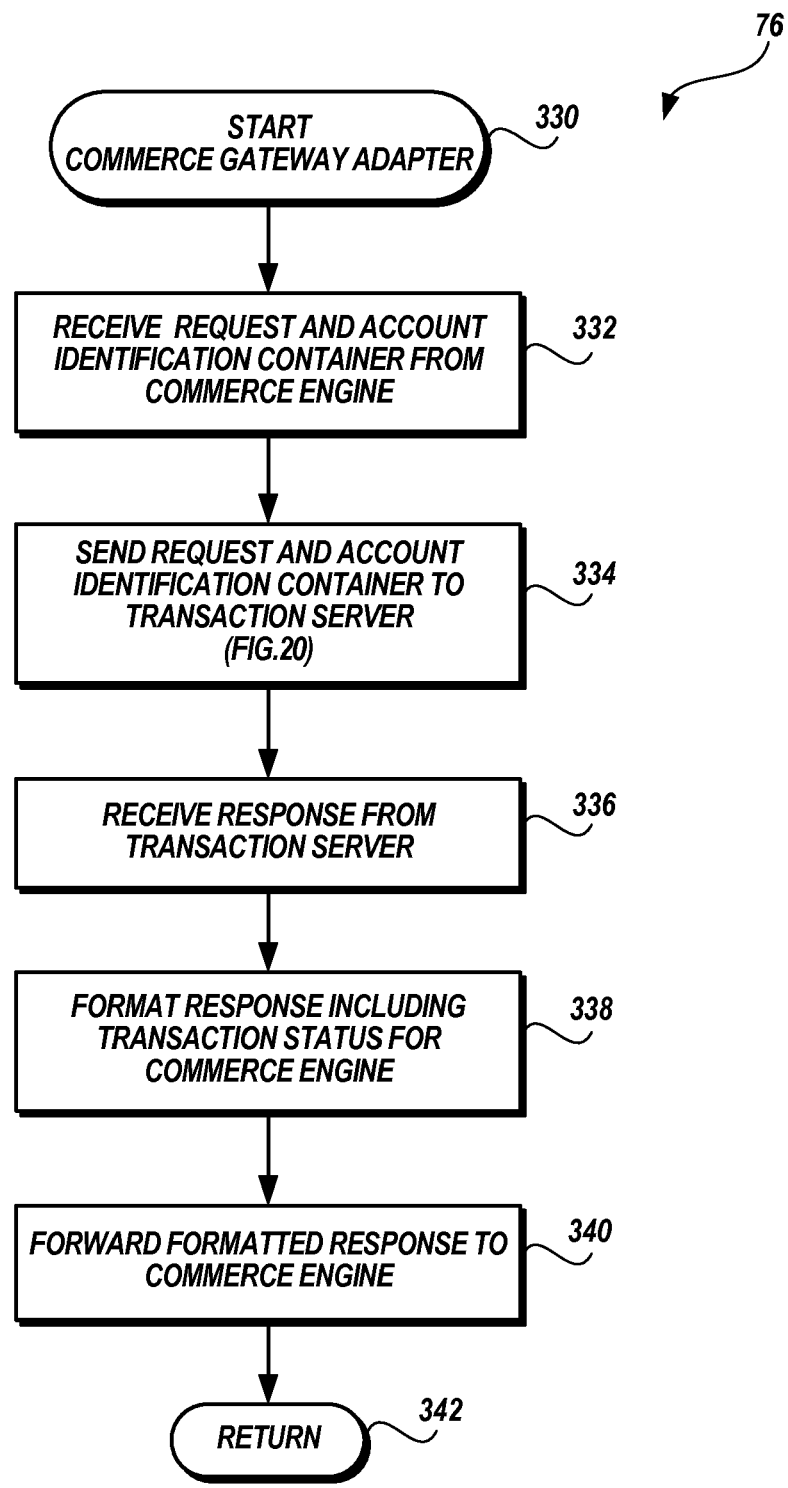
FIG. 19 is a flow diagram illustrating the logic used by a commerce gateway adapter of the merchant server shown in FIG. 4 to allow the commerce engine to communicate with a transaction server on the commerce gateway.

Returning to FIG. 12, after the sub-account password and authentication container are sent to the commerce gateway 53, the logic then proceeds to a block 234 where the logic waits to receive the account identification container from the account identification container generator component 88 of the commerce gateway 52. Once the account identification container is received from the commerce gateway 52, the logic proceeds to a block 238 where a purchase request is sent to the commerce engine 75 in the form of a request and account identification container for processing as shown in FIG. 18 and described next.

The commerce engine 75 is the component of the merchant computer that determines whether or not the order will be processed and whether the requested product will ultimately be provided to the consumer. It will be appreciated that commerce engines are well known in the art. The commerce engine component 75 used in conjunction with the commerce gateway adapter component 76 allows the virtual payment system of the present invention to expand existing technology that is currently used for traditional credit systems to encompass the virtual payment account of the present system. It will be further appreciated that while the embodiment shown and described modifies the commerce engine to achieve this functionality (which may be possible through existing API calls of the commerce engine), other embodiments are possible. This expanded commerce engine functionality is shown in FIG. 18. The logic of FIG. 18 begins in a block 300 and proceeds to a block 302 where a purchase request and account identification container are received from the Web browser 64 of the consumer computer 50. The logic then proceeds to a decision block 304 where a test is made to determine whether the purchase request should be forwarded to the commerce gateway adapter 76. If the purchase request is to purchase products using a virtual payment card, the request should be forwarded to the commerce gateway adapter 76 for processing in accordance with the virtual payment system of the present invention. In another embodiment, only the request (without the account identification container) is received from the Web browser in block 302, and if it is determined in decision block 304 that the purchase request should be forwarded to the commerce gateway adapter 76, the account identification is then obtained from the Web browser 64. In either case, if it is determined in decision block 304, that the purchase request should be forwarded to the commerce gateway adapter 76, the logic proceeds to a block 306 where the request is forwarded to the commerce gateway adapter. The commerce gateway adapter 76 is shown in more detail in FIG. 19 and described next.

Figure 20:
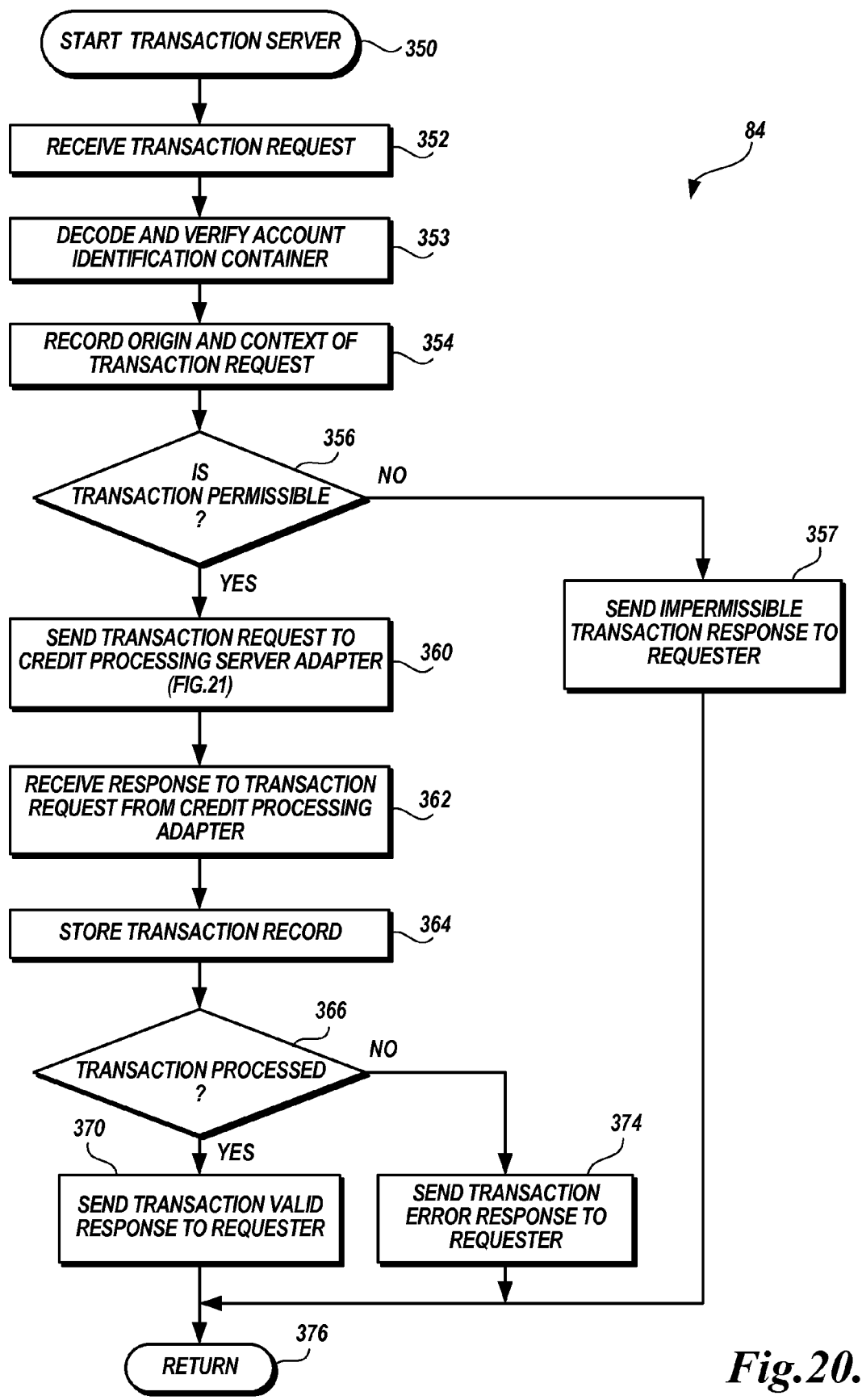
FIG. 20 is a flow diagram illustrating the logic used by the transaction server of the commerce gateway shown in FIG. 5 to process an order for goods, services and/or content over the Internet using a virtual payment account.

The commerce gateway adapter 76 is a component residing on the merchant server 51 that allows the merchant server to communicate directly with the transaction server component 84 of the commerce gateway 52 in order to expand the authorization function of the commerce engine to include virtual payment account transactions. Accordingly, the logic of FIG. 19 begins in a block 330 proceeds to a block 332 where the forwarded purchase request and account identification container are received from the commerce engine 75. Next, in a block 334 the purchase request and account identification container are sent to the transaction server 84 in the form of a transaction request for further processing as shown in FIG. 20 and described next.

The transaction server component 84 of the commerce gateway 52 is responsible for interfacing with the other components of the system and determining whether or not a requested transaction should be applied to a consumer's virtual payment account. The logic of FIG. 20 begins in a block 350 and proceeds to a block 352 where the transaction request is received. Next, in a block 353 the account identification container is decoded and verified. The origin or source of the request as well as the context, i.e., date and time, of the request are then recorded in memory 83 of the commerce gateway 52 in a block 354. Next, the logic proceeds to a decision block 356 where a test is made to determine whether the requested transaction is permissible. A variety of factors can be considered in making the determination of whether a requested transaction is permissible. For example, spending limit cannot be exceeded, and user-imposed limitations, such as those put on a young shopper account, e.g., sites from which the young shopper can make purchases and hours during which the young shopper can make purchases as shown in FIG. 9D, cannot be violated.

If the transaction is not permissible, the logic proceeds to a block 357 where an impermissible transaction message is sent to the requester (e.g., the commerce gateway adapter 76 in the context of a purchase request). The logic of FIG. 20 then ends in a block 376. If, however, the transaction is permissible, the logic proceeds from decision block 356 to a block 360 where the transaction request is sent to a credit processing server adapter 86 for further processing as shown in FIG. 21 and described next.

The credit processing server adapter 86 is the component residing on the commerce gateway 52 that allows commerce gateway 52 components, such as the transaction server 84 and the enrollment server 89 to communicate directly with the various sub-systems of the credit processing server 53, which provide for the application of the requested transaction to the consumer's actual payment account. Accordingly, the logic of FIG. 21 begins in a block 380 and proceeds to a block 382 where the request is received. For example, a purchase authorization request or a refund request are received from the transaction server 84 and a credit information request is received from the enrollment server 89. The request is then formatted to be compatible with the appropriate credit processing sub-system, i.e., the account/billing sub-system 94, the payment processing sub-system 95 and/or the account enrollment sub-system 96, on the credit processing server 53 in a block 384. Next, the logic proceeds to a block 386 where the formatted request is then sent to credit processing server 53 for processing by the appropriate credit processing sub-system, as shown in FIG. 22 and described next.

For any credit processing sub-system, the logic of FIG. 22 begins in a block 390 and proceeds to a block 392 where the transaction request is received from the credit processing server adapter 86. Next, account data and sub-account data are retrieved in blocks 394 and 396, respectively from the appropriate database, e.g., account database 97 and financial database 98. Standard credit transaction processing is then performed in a block 398. Examples of standard transactions for the account/billing sub-system 94 include: creating and maintaining accounts, including holding account information and account holder information, such as name and address; calculating interest; calculating minimum monthly payments; generating electronic monthly statements; and calculating other charges, known as discounts. The discount is the portion of the transaction amount that will go to the provider of the commerce gateway 52, and can be determined on a fixed amount per transaction basis, or a percentage of transaction amount basis. Examples of standard transactions for the payment processing sub-system 95 include: collecting payments from consumers and applying the payments to the consumer's account; transferring funds between merchants and consumer, for example by interfacing with financial institutions 59 for ACH transactions. Examples of standard transactions for the account enrollment sub-system include: obtaining credit information from credit bureaus; providing the credit information to the commerce gateway 52 for scoring; determining a credit score based on the credit information and providing the score to the commerce gateway; and providing scoring information to the account/billing sub-system 94 for account creation.

The logic then proceeds to a block 399 where necessary account adjustments are applied, if applicable. For example, the open to buy amount will be reduced by the amount of an authorized purchase transaction. In one embodiment of the present invention, loyalty points are accrued at the time of purchase, but committed later, for example during the periodic, e.g., monthly, statement preparation process. Alternatively, loyalty points may not accrue until payment is made for the product to which the points are attributed. Next, the transaction result, such as the credit information or the purchase authorization, is sent to the credit processing server adapter 86 in a block 400. The logic of FIG. 22 then ends in a block 402 and processing returns to FIG. 21.

Returning to FIG. 21, the result of the transaction request is received from the credit processing sub-system 94, 95, 96 in a block 387. Next, in a block 388, the result is then returned to requester, e.g., the result of a purchase authorization request is returned to the transaction server 84 and credit information, for example, a credit limit, is returned to the enrollment server 89 in response to request for a credit information request to be used for establishing a consumer's account. The logic of FIG. 19 then ends in a block 389 and processing returns to the requester, e.g., transaction server 84 (FIG. 20) or enrollment server 89 (FIG. 16).

Returning to FIG. 20, once the transaction server receives the response to its transaction request, e.g., authorization result of a purchase request, from the credit processing adapter in a block 362, the logic proceeds to a block 364 where the transaction record, for example purchase information including amount of purchase, is stored in memory 83 of the commerce gateway 52. The logic then proceeds to a decision block 366, where a test is made to determine if the transaction was successfully processed. If so, the logic proceeds to a block 370 where a transaction response with a valid status is then sent to the requester (e.g., the commerce gateway adapter 76 or the Web browser 64, whichever the case may be). If the transaction was not successfully processed, the logic proceeds from decision block 366 to a block 374 where a transaction response with an error status is then returned to the requester in a block 374.

After a valid transaction response 370, an error transaction response 374, or an impermissible transaction response 357 is sent to the requester, the logic of FIG. 20 ends in block 376 and processing returns to the requester. In the case of a purchase request, the requester is the commerce gateway adapter 76.

Returning to FIG. 19, after the response to the purchase request made by the commerce gateway adapter 76 is received from the transaction server in a block 336, the logic proceeds to a block 338 where the response including the transaction status is formatted to be compatible with the commerce engine 75. The formatted response is then forwarded to the commerce engine in a block 340. The logic of FIG. 19 then ends in a block 342 and processing returns to the commerce engine 75 in FIG. 18.

Returning to FIG. 18, once a response is received by the commerce engine 75 from the commerce gateway adapter 86 in a block 308, the authorized and ordered product is shipped to the consumer in a block 310. It will be appreciated by those of ordinary skill in the art that if the ordered product is capable of being downloaded, e.g., the product is an electronically stored good, a URL for a premium content Web site, etc., the product will simply be transferred by the merchant server 51 to the consumer computer 50. Otherwise, the product will be shipped or provided by more traditional methods, e.g., regular mail, hand delivery, etc. Once shipment is complete, the logic then proceeds to a block 312 where a settlement request is sent to the commerce gateway 52 in order to initiate movement of funds. In an actual embodiment of the present invention, the merchant submits the transaction into a settlement batch for payment when the settlement batch for that merchant is next processed. The timing of the processing could be that night or at a later date based on the contract, i.e., terms of the purchase transaction. Next, in a block 314, a response confirming fulfillment of the order is sent to the Web browser 64 of the consumer's computer 50. The logic of FIG. 18 then ends in a block 324.

Returning to decision block 304, if it is determined that the purchase request should not be forwarded to the commerce gateway 52, the logic proceeds to a block 316 where standard commerce engine processing is performed. More specifically, in block 316 traditional credit or debit card authorization is performed such as approval or denial for the use of a credit card, e.g., VISA® or MASTERCARD®, for the specified purchase amount. Next, the authorized goods are shipped in a block 318. The logic then proceeds to a block 320 where a settlement request is sent to the traditional credit provider, e.g., VISA® or MASTERCARD®. A response confirming fulfillment of the order is then sent to the Web browser 64 of the consumer computer 50 in a block 322. The logic of FIG. 18 then ends in block 324 and processing returns to FIG. 12.

Returning to FIG. 12, once the Web browser 64 of the consumer computer 50 receives a response to its purchase request in a block 240, the logic proceeds to a block 241 where an order confirmation Web page 180 is displayed as shown in FIG. 11E. The logic of FIG. 12 then ends in block 242.

FIG. 23 is a diagram illustrating the actions taken by the consumer's computer 50, the merchant server 51, the commerce gateway 52, and the credit processing server 53, for ordering products using a virtual payment account system. This diagram presents a high-level view of the detailed processing shown in the flow charts described above. Upon a request to purchase product 500, such as is shown in FIG. 11B, a merchant's order form, such as the one shown in FIG. 11C is provided to the consumer's computer 50 by the merchant 51. The consumer's computer 50 submits the completed order form including the selection of a virtual payment account as the method of payment to the merchant server 51. An authentication request 506 for this consumer is then sent from the consumer's computer 50 to the commerce gateway 52 over a secure link, such as SSL. The authentication status 508, as determined by the consumer authenticator component 65, is then returned from the commerce gateway 52 to the consumer's computer 50 over the secure link. The consumer's computer 50 then sends a sub-account selection 510 to the commerce gateway, and the commerce gateway returns an account identification container 512 to the consumer's computer 50. A purchase request including the account identification container 514 is then sent from the consumer's computer 50 to the merchant server 51. The purchase request including the account identification container 515 is then forwarded from the merchant server 51 to the commerce gateway 52. The commerce gateway 52 then sends a purchase authorization request 516 to the credit processing server 53. After the commerce gateway 52 receives the authorization status 517 from the credit processing server 53, the commerce gateway 52 sends a valid transaction authorization 518 to the merchant server 51. Upon receipt of the valid transaction authorization 518, the merchant server 51 forwards the valid transaction notification and ships the authorized product 519 to the consumer's computer 50. If the product is downloadable, it is downloaded from the merchant server 51 to the consumer's computer 50, otherwise, the product is shipped via traditional shipping channels, such as by the postal service. Settlement for the purchase is a separate transaction that is later initiated by the merchant.

If the merchant is an auction Web site, the valid transaction authorization 518 sent by the commerce gateway 52 to the merchant server 51 includes information such as a consumer account identification, a merchant identification, a merchant sale offering, a consumer authentication, a merchant authentication, and a master identification, i.e., identification of the commerce gateway 52 provider. Particular to this type of response is an expiration date/time that is used to signal the shorter of the maximum times that the consumer and the merchant are willing to "reserve" funds associated with this transaction. If the transaction, i.e., settlement request 520, is not received by the commerce gateway 52 before the expiration date/time all funds and goods will be released back to their owners. At a later time, once the consumer has committed to the purchase, the consumer releases a valid transaction authorization to the provider of the commerce gateway 52 knowing that the merchant has proven ability to ship the goods on demand without delay. This initiates the actual settlement of funds and triggers payment to the merchant in the next settlement batch, without any further interaction with the merchant. This payment method supports consumer-initiated, pre-approved purchases with expiration date/time, such as auction and gift-certificate purchases.

It will be appreciated that FIG. 23 illustrates processing of a valid purchase transaction. If there is an error at any time during the processing, e.g., consumer is not authorized because he or she is not a registered consumer, has exceeded his or her spending limit, etc., processing will terminate after an appropriate error response has been returned to the consumer computer 50 for display to the consumer via the Web browser 64.

Settlement Transaction

When a merchant establishes a merchant account, a contract is formed defining the relationship between the merchant and the commerce gateway provider. That contract defines the terms, such as when payments will be funded and a fee to be given to the commerce gateway provider. The commerce gateway fee can be a per transaction fee or a percentage fee based on the amount of a transaction The logic for settlement transactions for a virtual payment account is similar to the logic used for processing standard credit card settlement transactions. After the merchant ships the product, the merchant sends a settlement transaction to the commerce gateway as shown in FIG. 24. It will be appreciated that the logic performed by the merchant server 51 can be performed by the commerce engine component 75, or some other component, for example, a Web browser (not shown) residing on the merchant server 51. FIG. 24 illustrates the logic implemented by merchant server 51 when the merchant wishes to perform a settlement transaction. The logic begins in a block 530 and proceeds to a block 532 where a secure connection between the merchant computer 51 and commerce gateway 52 is established, using the same logic shown and described with reference to the consumer in block 222 of FIG. 12. The logic then proceeds to a block 534 where the merchant authenticator process is run. The merchant authenticator process is similar to the consumer authenticator process shown in FIG. 13 and described above. Next, in a decision block 536 a test is made to determine if the merchant is a registered participant. If not, the logic proceeds to a block 538 where a merchant authentication error message is displayed on the merchant server display 72, for example, via a Web browser. The logic of FIG. 24 then ends in a block 548.

If the merchant authenticator process is successful, the logic proceeds from decision block 536 to a block 540 where a settlement request is sent to the transaction server on the commerce gateway 52. As shown and described in FIG. 20, the transaction server 84 forwards the request to the credit processing server adapter 86, which in turn forwards the transaction request to the appropriate credit processing subsystem. In the case of a settlement transaction request, the payment processing sub-system 95 processes the transaction. The payment processing sub-system forwards the settlement request to the financial institution 59. The financial institution funds the transactions into the commerce gateway provider's account. The commerce gateway provider takes its percentage and pays the merchants their portion.

The financial institution waits for their billing cycle, e.g., monthly, and then charges the consumers for their purchases plus interest charges. The financial institution waits for the consumer payments. If the consumer does not pay, standard late payment processing, such as late notices, finance charges, etc. is performed.

Referring to FIG. 24, after the transaction server 84 has processed the settlement transaction and provided the results of the settlement transaction to the merchant's computer 51, the result of the settlement transaction is displayed on the merchant's display 73, for example, via the merchant server's Web browser. The logic of FIG. 24 then ends in block 548.

Refund Transaction

FIG. 25 illustrates the logic implemented by the present invention when a refund transaction is initiated, for example, when a consumer disputes a charge on his or her virtual payment account. As with any payment dispute, it must be determined whether the consumer will receive all or a portion of the disputed amount. This process is external to the virtual payment system of the present invention. The determination of whether dispute has merit is determined by the merchant. If the merchant determines that the dispute has merit, the merchant notifies a customer service representative and a refund transaction is initiated. In the embodiment shown in FIG. 25 and described herein, if it is determined that an amount disputed by a consumer is subject to a refund, a customer service representative initiates the refund, or chargeback, transaction via the administrative computer 54 shown in FIG. 2. In one actual embodiment, the administrative computer is a "dumb terminal" by which the customer service representative enters information directly into the transaction server 84 on the commerce gateway 52. In another embodiment, the administrative computer may have a Web browser that allows the administrator to enter the information using Web pages available only on the LAN 44 behind the firewall, i.e., the consumer and merchant do not have access to the administrative Web pages.

Referring to FIG. 25, the logic begins in a block 550 and proceeds to a block 552 where a the refund information including account, sub-account, and amount is obtained. The refund transaction information is then sent to the transaction server 84 by the administrative computer 54 in a block 554 in the form of a refund request. Transaction server 84 processing is shown and described with reference to FIG. 20.

As also noted above, in processing the refund request, the transaction server 84 will forward a transaction request to the credit processing server 53 for processing by the account/billing sub-system 94 as shown in FIG. 22. As with the settlement transaction as shown in FIG. 24 and described above, a refund applied to a consumer's virtual payment account causes the consumer's open to buy amount to increase by the amount of the payment. Still referring to FIG. 25, after the transaction server 84 has processed the refund transaction, the result of the transaction processing is received and displayed by the administrative computer 54. The logic of FIG. 25 then ends in a block 558. Unlike the purchase transaction, the refund transaction is not initiated by the consumer via the Web browser, therefore, the consumer is notified by other means, for example by sending an e-mail message to the consumer's computer 50. It will also be appreciated that in yet other embodiments of the present invention, the merchant server 51 may initiate the refund request as opposed to the administrative computer 54.

Account Management

Other transactions normally associated with an account such as a standard credit card account are also applicable to the virtual payment account of the present invention. FIGS. 26-29 illustrate some examples of Web pages used by a consumer with a virtual payment account. Processing of these transactions is similar to other transaction processing as illustrated in flow diagrams and described above, and therefore will not be discussed in further detail herein. FIG. 26 illustrates an exemplary Web page summarizing the sub-accounts for a master account 632. FIG. 27 illustrates a Web page containing details of a sub-account 634. FIG. 28 illustrates a transaction summary for the sub-accounts for a given master account 636. FIG. 29 illustrates an exemplary Web page enumerating reward points earned by various sub-account holders for a given master account. It will be appreciated that the reward Web page 638 is not a standard feature of all standard accounts, such as a credit card account.

While the preferred embodiment of the invention has been illustrated and described, it will be appreciated that various changes can be made therein without departing from the spirit and scope of the invention. For example, it will also be appreciated that there are other transactions applicable to a the virtual payment account of the present invention, e.g., account closure, the credit limit modification, overdue account notification, etc. It will be appreciated that these transactions can be initiated by various components of the system, for example a financial institution may institute a change in a credit limit by sending a request to one of the sub-systems on the credit processing server. One of ordinary skill in the art will recognize that the requests for such transactions are processed by the virtual payment system of the present invention in a manner similar to the processing of the purchase settlement, and refund transactions described in detail above.

The embodiments of the invention in which an exclusive property or privilege is claimed are defined as follows:

1. An apparatus for purchasing a product from a plurality of computers and servers connected to form an internetwork, the apparatus comprising:
   (a) a consumer's computer comprising a network interface for connecting to the internetwork, a processing unit coupled to the network interface, and a storage medium coupled to the processing unit, the storage medium containing program code executed by the processing unit for purchasing the product;
   (b) a commerce gateway comprising a network interface for connecting to the internetwork, a processing unit coupled to the network interface, and a storage medium coupled to the processing unit, the storage medium containing program code executed by the processing unit for processing the purchase made via the consumer's computer;
   (c) a merchant server comprising a network interface for connecting to the internetwork, a processing unit coupled to the network interface, and a storage medium coupled to the processing unit, the storage medium containing program code executed by the processing unit for supplying the product purchased via the consumer's computer and processed by the commerce gateway; and
   (d) a credit processing server comprising a network interface for connecting to the internetwork, a processing unit coupled to the network interface, and a storage medium coupled to the processing unit, the storage medium containing program code executed by the processing unit for handling payments for the purchase.

The invention claimed is:

1. A method for purchasing a product from a merchant server using a virtual payment account, the merchant server storing a product database containing information regarding tangible items offered for sale, the method comprising:
   in association with a merchant server receiving an order from a consumer computer to purchase a tangible product from the merchant server using a virtual payment account, transmitting an authentication request via a secure link to a commerce gateway that serves a plurality of merchant servers, including the merchant server;
   in response to the commerce gateway receiving the authentication request, determining whether a valid virtual payment account maintained by the commerce gateway is associated with the consumer computer;
   in response to the commerce gateway determining that a valid virtual payment account is associated with the consumer computer, returning an account identifier to the consumer computer;
   in response to the merchant server receiving the order to purchase the tangible product and the account identifier from the consumer computer, obtaining a valid transaction authorization from the commerce gateway; and
   in response to the merchant server receiving the valid transaction authorization, completing the purchase of the tangible product.

2. The method of claim 1, wherein determining whether a valid virtual payment account maintained by the commerce gateway is associated with the consumer computer comprises:
   transmitting the authentication request from said consumer computer to the commerce gateway;
   determining at said commerce gateway whether a valid virtual payment account is associated with said consumer computer; and
   transmitting an account identification container to said consumer computer in response to determining that said consumer computer is associated with the valid virtual payment account.

3. The method of claim 2, wherein said authentication request comprises a digital certificate.

4. The method of claim 2, wherein applying a cost of said product to said virtual payment account comprises:
   receiving said account identification container at said merchant server;
   transmitting said account identification container and said cost of said product from said merchant server to said commerce gateway;
   determining whether said virtual payment account may be charged for said cost of said product; and in response to determining that said virtual payment account may be charged for said cost of said product, transmitting a valid transaction authorization from said commerce gateway to said merchant server.

5. The method of claim 2, wherein said virtual payment account comprises a main account and at least one sub-account.

6. The method of claim 5, wherein said sub-account is operative only to accept charges from a predetermined list of merchant servers.

7. The method of claim 5, wherein a spending limit may be set by said consumer for said sub-account.

8. A method for purchasing a product from a merchant server using a virtual payment account associated with a consumer computer, the merchant server storing a product database containing information regarding tangible items offered for sale, the method comprising:

in association with a merchant server receiving an order from said consumer computer to purchase a tangible product using a virtual payment account as the method of payment for said product, transmitting an authentication request via a secure link to a commerce gateway that serves a plurality of merchant servers, including the merchant server;

in response to the commerce gateway receiving said authentication request at said commerce gateway, determining whether a valid virtual payment account is associated with said consumer computer at said commerce gateway;

in response to the commerce gateway determining that a valid virtual payment account is associated with said consumer computer, transmitting an account identification container to said consumer computer;

transmitting a purchase request including said account identification container from said consumer computer to said merchant server;

transmitting said purchase request from said merchant server to said commerce gateway;

receiving said purchase request at said commerce gateway and determining whether said virtual payment account may be used to pay for said product;

in response to determining that said virtual payment account may be used to pay for said product, transmitting a valid transaction authorization from said commerce gateway to said merchant server and said consumer computer;

charging said virtual payment account for a cost associated with said product; and providing said tangible product to a consumer associated with said consumer computer by shipping the tangible product to the consumer.

9. The method of claim 8, wherein said virtual payment account comprises a main account and at least one sub-account.

10. The method of claim 9, wherein charging said virtual payment account for a cost associated with said product comprises charging said sub-account for a cost associated with said product.

11. The method of claim 10, further comprising:

determining whether said sub-account is authorized to receive a charge from said merchant server; and charging said sub-account for a cost associated with said product in response to determining that said sub-account is authorized to receive said charge from said merchant server.

12. The method of claim 9, wherein determining whether said virtual payment account may be used to pay for said product comprises determining whether a spending limit has been exceeded.

13. The method of claim 8, wherein said virtual payment account comprises a credit account.

14. The method of claim 8, wherein said virtual payment account comprises a pre-paid account.

15. The method of claim 8, wherein said authentication request comprises a digital certificate, and wherein said digital certificate is transmitted to said commerce gateway via a secure link.

16. The method of claim 15, wherein said digital certificate is created at said commerce gateway and is transmitted to said consumer computer at the time a virtual payment account associated with said consumer computer is created.

17. The method of claim 16, wherein said digital certificate is encrypted.

18. A computer-controlled apparatus for performing the method of claim 8.

19. A computer-readable medium containing instructions which, when executed by a computer, perform the method of claim 8.

* * * * *

UNITED STATES PATENT AND TRADEMARK OFFICE
CERTIFICATE OF CORRECTION

PATENT NO. : 7,606,760 B2 Page 1 of 1
APPLICATION NO. : 10/671320
DATED : October 20, 2009
INVENTOR(S) : R. B. Hutchison et al.

It is certified that error appears in the above-identified patent and that said Letters Patent is hereby corrected as shown below:

| COLUMN | LINE | ERROR |
|---|---|---|
| (73) Pg. 1, col. 1 | Assignee | "seattle," should read --Seattle,-- |
| 25 | 52-53 | Delete "The embodiments of the invention in which an exclusive property or privilege is claimed are defined as follows:" |
| 25<br>26<br>(Claim 1, | 54-67<br>1-16<br>line 1) | Delete entirety of Claim 1 which begins "1. An apparatus for purchasing a product from a plurality of computers . . ." |

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,606,760 B2 Page 1 of 1
APPLICATION NO. : 10/671320
DATED : October 20, 2009
INVENTOR(S) : Hutchison et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1623 days.

Signed and Sealed this

Twelfth Day of October, 2010

David J. Kappos
*Director of the United States Patent and Trademark Office*